US010530671B2

(12) United States Patent
Sanders et al.

(10) Patent No.: US 10,530,671 B2
(45) Date of Patent: Jan. 7, 2020

(54) METHODS, SYSTEMS, AND COMPUTER READABLE MEDIA FOR GENERATING AND USING A WEB PAGE CLASSIFICATION MODEL

(71) Applicant: The University of North Carolina at Chapel Hill, Chapel Hill, NC (US)

(72) Inventors: Sean Marcus Sanders, Chapel Hill, NC (US); Jasleen Kaur, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 165 days.

(21) Appl. No.: 15/544,214

(22) PCT Filed: Jan. 14, 2016

(86) PCT No.: PCT/US2016/013363
§ 371 (c)(1),
(2) Date: Jul. 17, 2017

(87) PCT Pub. No.: WO2016/115319
PCT Pub. Date: Jul. 21, 2016

(65) Prior Publication Data
US 2018/0013639 A1    Jan. 11, 2018

Related U.S. Application Data

(60) Provisional application No. 62/104,052, filed on Jan. 15, 2015.

(51) Int. Cl.
*H04L 12/26*    (2006.01)
*G06N 20/00*    (2019.01)
(Continued)

(52) U.S. Cl.
CPC .......... *H04L 43/026* (2013.01); *G06N 20/00* (2019.01); *H04L 41/16* (2013.01); *H04L 69/22* (2013.01); *H04L 69/16* (2013.01)

(58) Field of Classification Search
None
See application file for complete search history.

(56) References Cited

U.S. PATENT DOCUMENTS

| 8,484,194 | B1 * | 7/2013 | Juang | G06F 16/353 |
| | | | | 707/710 |
| 2003/0149694 | A1 * | 8/2003 | Ma | G06F 16/951 |

(Continued)

FOREIGN PATENT DOCUMENTS

| CN | 101464905 A | 6/2009 |
| CN | 102567494 A | 7/2012 |

OTHER PUBLICATIONS

Notification of Transmittal of the International Search Report and the Written Opinion of the International Searching Authority, or the Declaration for International Application No. PCT/US2016/013363 (dated May 19, 2016).

(Continued)

*Primary Examiner* — Joshua Joo
(74) *Attorney, Agent, or Firm* — Jenkins, Wilson, Taylor & Hunt, P.A.

(57) ABSTRACT

Methods, systems, and computer readable media for generating and using a web page classification model are disclosed. The method may include identifying a plurality of web pages for generating a web page classification model, assigning a label to each of the plurality of web pages, accessing Transmission Control Protocol/Internet Protocol (TCP/IP) traffic traces associated with downloading content from each of the plurality of web pages, processing TCP/IP headers from the TCP/IP traffic traces to identify and extract features that discriminate between the labels, that are uncor-
(Continued)

related and whose discriminatory accuracy remains stable across time and/or browser platform. The method may further include generating a web page classification model by training a trainer to learn a combination of the features that accurately discriminates between the labels. The model is usable to classify unlabeled web pages by applying the model to TCP/IP traffic traces used to access the unlabeled web pages.

21 Claims, 11 Drawing Sheets

(51) Int. Cl.
*H04L 12/24* (2006.01)
*H04L 29/06* (2006.01)

(56) References Cited

U.S. PATENT DOCUMENTS

| | | | | |
|---|---|---|---|---|
| 2003/0221163 | A1* | 11/2003 | Glover | G06F 16/353 715/205 |
| 2006/0122998 | A1* | 6/2006 | Bar-Yossef | G06F 16/951 |
| 2007/0136457 | A1* | 6/2007 | Dai | G06Q 30/02 709/224 |
| 2008/0104113 | A1* | 5/2008 | Wong | G06F 16/9535 |
| 2008/0270376 | A1* | 10/2008 | Svore | G06F 16/958 |
| 2010/0257440 | A1* | 10/2010 | Kshirsagar | G06F 16/986 715/230 |
| 2013/0148513 | A1* | 6/2013 | Szabo | H04L 41/142 370/252 |
| 2014/0310396 | A1 | 10/2014 | Christodorescu et al. | |
| 2015/0066934 | A1* | 3/2015 | Duan | G06K 9/6256 707/737 |
| 2015/0312422 | A1* | 10/2015 | Leemet | H04L 41/082 455/406 |

OTHER PUBLICATIONS

"2013 mobile device survey," SC magazine, https://www.scmagazine.com/2013-mobile-device-survey/slideshow/3444/#1 (2013).
"In-Browser Messaging for Service Providers," frontporch, www.Frontporch.com, Accessed through Wayback machine https://web.archive.org/web/20170328221447/http://www.frontporch.com, pp. 1-4 (Mar. 28, 2017).
"PageSpeed Tools," Accessed through Wayback Machine https://web.archive.org/web/20140314051841/https://developers.google.com/speed/pagespeed/, 1 page (Jul. 9, 2013).
"Usage of HTTP/2 for websites," W3Techs, Web Technology Surveys, https://w3techs.com/technologies/details/ce-http2/all/all, pp. 1-3 (Accessed Nov. 2017).
Adurthi et al., "Realistic TCP Traffic Generation in ns-2 and GTNetS," (Accessed through Wayback Machine https://web.archive.org/web/20120103121331/http://www.cs.odu.edu/~mweigle/papers/adurthi-tmix-TR06.pdf, pp. 1-8 (Jan. 3, 2012).
Borges et al., "A Dynamic Clustering-Based Markov Model of Web Usage Mining," arXiv preprint cs/0406032, pp. 1-21 (May 26, 2004).
Chierichetti et al., "Are Web Users Really Markovian?, " WWW 2012-Session: Web User Behavioral Analysis and Modeling, pp. 609-618 (Apr. 16-20, 2012).
Coull et al., "On Web Browsing Privacy in Anonymized NetFlows," USENIX Security, pp. 1-20 (2007).
Deri et al., "nDPI: Open-Source High-Speed Deep Packet Inspection," International Wireless Communications and Mobile Computing Conference (IWCMC), pp. 1-6 (2014).
Dyer et al., "Peek-a-Boo, I Still See You: Why Efficient Traffic Analysis Countermeasures Fail," 2012 IEEE Symposium on Security and Privacy, pp. 332-346 (2012).
Fraleigh et al., "Packet-Level Traffic Measurements from the Sprint IP Backbone," IEEE Network, vol. 17, No. 6, pp. 1-12 (2003).
PageSpeed, "Analyze and optimze your website with PageSpeed tools," https://developers.google.com/speed/, pp. 1-2 (Accessed Jan. 30, 2018).
Hernandez-Campos et al., "Tracking the Evolution of Web Traffic: 1995-2003," 11th IEEE/ACM International Symposium on Modeling, Analysis, and Simulation of Computer and Telecommunication Systems (MASCOTS), pp. 1-12 (Oct. 2003).
Kurose et al., "Computer Networking," Pearson Education, pp. 1-889 (2012).
Kurose et al., "Computer Networking: A Top-Down Approach Featuring the Internet, 3rd edition," Pearson Education India, pp. 1-679 (Apr. 26, 2005).
Le et al., "The effects of active queue management on web performance," Proceedings of the 2003 Conference on Applications, Technologies, Architectures, and Protocols for Computer Communications, pp. 1-12 (Aug. 25-29, 2003).
Liberatore et al., "Inferring the Source of Encrypted HTTP Connections," Proceedings of the 13th ACM Conference on Computer and Communications Security, pp. 255-263 (2006).
Richardson, "Beautiful Soup Documentation Release 4.4.0," https://www.crummy.com/software/BeautifulSoup/bs3/documentation.html , pp. 1-39 (2013).
Sanadhya et al., "Asymmetric Caching: Improved Network Deduplication for Mobile Devices," Proceedings of the 18th Annual International Conference on Mobile Computing and Networking, pp. 1-12 (Aug. 22-26, 2012).
Schneier, "Attacking Tor: how the NSA targets users' online anonymity," The Guardian pp. 1-5 (Oct. 4, 2013).
Schroter, "Client-side Performance Optimization," Computer Science and Media Stuttgart Media University, http://www.slideshare.net/jakob.schroeter/clientside-web-performance-optimization, pp. 1-26 (Jan. 2011).
Schurman et al., "Performance Related Changes and their User Impact," Accessed through Wayback Machine http://www.scribd.com/doc/16877297/Performance-Related-Changes-and-their-User-Impact, pp. 1-3 (Jun. 28, 2009).
Song et al., "Exploring and Exploiting User Search Behavior on Mobile and Tablet Devices to Improve Search Relevance," Proceedings of the 22nd international conference on World Wide Web, pp. 1201-1211 (2013).
Sun et al., "Statistical Identication of Encrypted Web Browsing Traffic," Proc.of IEEE Symposium on Security and Privacy, pp. 1-13 (Mar. 2002).
Theurer, "Performance Research, Part 1: What the 80/20 Rule Tells Us about Reducing HTTP Requests," https://yuiblog.com/blog/2006/11/28/performance-research-part-1/, pp. 1-6 (Nov. 28, 2006).
Weinberger et al., "Feature Hashing for Large Scale Multitask Learning," Proceedings of the 26th Annual International Conference on Machine Learning, pp. 1-10 (Feb. 27, 2009).
Willinger et al., "Self-Similarity Through High-Variability: Statistical Analysis of Ethernet LAN Traffic at the Source Level," IEEE/ACM Transactions on Networking, vol. 5, No. 1, pp. 71-86 (Apr. 15, 1997).
Yan et al, "Argus: End-to-End Service Anomaly Detection and Localization From an ISP's Point of View," 2012 Proceedings IEEE INFOCOM, pp. 1-5 (2012).
"18 U.S. Code § 2511—Interception and disclosure of wire, oral, or electronic communications prohibited," U.S. Code, Title 18, Part I, Chapter 119, Section 2511, pp. 1-6 (Jan. 4, 2012).
"A Personalised Internet Experience," Phorm. Accessed through Wayback Machine https://web.archive.org/web/20160403202917/http://www.phorm.com:80/, pp. 1-2 (Apr. 3, 2016).
Homepage, Alexa: The Web Information Company, Accessed through Wayback Machine, https://web.archive.org/web/20130205102720/http://www.alexa.com/, pp. 1-2 (Feb. 2, 2013).
Android Apps on Google Play—NoLock, https://play.google.com/store/apps/details?id=org.jraf.android.nolock&hl=en, pp. 1-3 (Accessed Nov. 2017).
Android Apps on Google Play—StayAwake, https://play.google.com/store/apps/details?id=com.gmail.developer.runks.enji&hl=en, pp. 1-3 (Accessed Nov. 2017).

(56) References Cited

OTHER PUBLICATIONS

"Web browsers (Global Marketshar)," Clicky, Accessed through Wayback Machine, https://web.archive.org/web/20130630130216/https://clicky.com/marketshare/global/web-browsers/, 1 page (Jun. 30, 2013).
"Firebug Web Development Evolved," Accessed through Wayback Machine https://web.archive.org/web/20140313112652/http://getfirebug.com, pp. 1-7 (Mar. 13, 2013).
"Global Internet Phenomena Report," Sandvine, Intelligent Broadband Networks, Access on Wayback Machine, https://web.archive.org/web/20140719101741/https://www.sandvine.com/downloads/general/global-internet-phenomena/2013/2h-2013-global-internet-phenomena-report.pdf, pp. 1-35 (Jul. 19, 2014).
Hunt, "HTML5 Reference: The Syntax, Vocabulary and APIs of HTML5," W3C Editior's Draft, http://dev.w3.org/html5/html-author/, pp. 1-52 (Aug. 9, 2010).
"HttpWatch 9.2," Accessed through Wayback Machine https://web.archive.org/web/20140213093804/http://www.httpwatch.com, pp. 1-2 (Feb. 13, 2013).
"IAB internet advertising revenue report," iab, https://www.iab.com/wp-content/uploads/2015/05/IAB_Internet_Advertising_Revenue_Report_FY_2013.pdf, pp. 1-28 (Apr. 2014).
"In-Browser Messaging for Service Proviers," frontporch, www.Frontporch.com, Accessed through Wayback machine https://web.archive.org/web/20170328221447/http://www.frontporch.com, pp. 1-4 (Mar. 28, 2017).
"Internet 2012 in numbers," solarwinds pingdom, http://royal.pingdom.com/2013/01/16/internet-2012-in-numbers/, pp. 1-8 (Jan. 16, 2013).
"Make sure your site's ready for mobile-friendly Google search results," Accessed through Wayback Machine https://web.archive.org/web/20150908155004/https://support.google.com/adsense/answer/6196932?hl=en, pp. 1-3 (Sep. 9, 2015).
"PageSpeed Tools," Accessed through Wayback Machine https://web.archive.org/web/20140314051841/https://developers.google.com/speed/pagespeed/, 1 page (Mar. 14, 2017).
"PCAP Web Performance Analyzer," Accessed through Wayback Machine https://web.archive.org/web/20140402164236/http://pcapperf.appspot.com, 1 page (Apr. 2, 2014).
"Selenium WebDriver," Accessed through Wayback Machine https://web.archive.org/web/20131127190754/http://www.seleniumhq.org/projects/webdriver/, 1 page (Nov. 27, 2013).
"StatCounter Global Stats," Accessed through Wayback machine https://web.archive.org/web/20130629094328/http://gs.statcounter.com/, pp. 1-7 (Jun. 29, 2013).
"The rather petite Internet of 1995," pblog, https://web.archive.org/web/20150419154829/http://royal.pingdom.com/2011/03/31/internet-1995/, pp. 1-3 (Mar. 31, 2011).
"Total number of Websites," Accessed through Wayback Machine https://web.archive.org/web/20150110102126/http://www.internetlivestats.com:80/total-number-of-websites/, pp. 1-5 (Jan. 10, 2015).
"Usage of HTTP/2 for websites," W3Techs, Web Technology Services, https://w3techs.com/technologies/details/ce-http2/all/all, pp. 1-3 (Accessed Nov. 2017).
"Websites blocked in mainland China," Accessed through Wayback Machine, https://web.archive.org/web/20150811012032/en.wikipedia.org/wiki/Websites_blocked_in_mainland_China, pp. 1-7 (Aug. 9, 2015).
"Why Web Performance Matters: Is Your Site Driving Customers Away?," Gomez, The Web Performance Division of Compuware, Whitepaper, www.gomez.com, pp. 1-8 (Oct. 2011).
Zachte, "Wikimedia Traffic Analysis Report—Browsers e.a.," https://stats.wikimedia.org/archive/squid_reports/2013-06/SquidReportClients.htm, pp. 1-8 (Jun. 9, 2013).
"YSlow," Accessed through Wayback Machine https://web.archive.org/web/20140228163752/http://developer.yahoo.com:80/yslow/, pp. 1-2 (Feb. 28, 2014).

Aceto et al., "PortLoad: taking the best of two worlds in traffic Classification," INFOCOM IEEE Conference on Computer Communications Workshops, pp. 1-5 (2010).
Adurthi et al., "Realistic TCP Traffic Generation in ns-2 and GTNetS," Accessed through Wayback Machine https://web.archive.org/web/20120103121331/http://www.cs.odu.edu/~mweigle/papers/adurthi-tmix-TR06.pdf, pp. 1-8 (Jan. 3, 20012).
Alcock et al., "Libprotoident: Traffic Classification Using Lightweight Packet Inspection," WAND Network Research Group, Tech. Rep, pp. 1-7 (2012).
Anand et al., "Redundancy in Network Traffic: Findings and Implications," Proceedings of the 11th International Joint Conference on Measurement and Modeling of Computer Systems, pp. 1-12 (Jun. 15-19, 2009).
Antonakakis et al., "Detecting Malware Domains at the Upper DNS Hierarchy," USENIX Security Symposium, pp. 1-16 (2011).
Asghari et al., "Deep Packet Inspection: Effects of Regulation on its Deployment by Internet Providers," TPRC, pp. 1-15 (2013).
Barbaro et al., "A Face Is Exposed for AOL Searcher No. 4417749," The New York Times, vol. 9, No. 2008, pp. 1-5 (Aug. 9, 2006).
Barford et al., "A Signal Analysis of Network Traffic Anomalies," Proceedings of the 2nd ACM SIGCOMM Workshop on Internet Measurment, pp. 71-82 (2002).
Barford et al., "An Architecture for a WWW Workload Generator," Wide Web Consortium Workshop on Workload Characterization, pp. 1-15 (1997).
Barford et al., "Generating Representative Web Workloads for Network and Server Performance Evaluation," Proceedings of the ACM SIGMETRICS International Conference on Measurement and Modeling of Computer Systems, vol. 26, No. 1, pp. 151-160 (Jul. 1998).
Basher et al., "A Comparative Analysis of Web and Peer-to-Peer Traffic," Proceedings of the 17th international conference on World Wide Web, pp. 287-296 (Apr. 21-25, 2008).
Baykan et al., "Pureley URL-based Topic Classification," Proceedings of the 18th International Conference on World Wide Web, pp. 1109-1110 (Apr. 20-24, 2009).
Bekkerman et al., "Web Page Clustering using Heuristic Search in the Web Graph," Proceedings of the International Joint Conference on Artificial Intelligence, pp. 1-6 (2007).
Belshe et al., "Hypertext Transfer Protocol Version 2 (HTTP/2)," Internet Engineering Task Force (IETF), pp. 1-96 (May 2015).
Benevenuto et al., "Characterizing User Behavior in Online Social Networks," Proceedings of the 9th ACM SIGCOMM Conference on Internet Measurement Conference, pp. 1-14 (Nov. 4-6, 2009).
Bishop, "Pattern Recognition and Machine Learning," Springer, pp. 1-738 (2006).
Bleakley et al., "The group fused Lasso for multiple change-point detection," arXiv preprint arXiv:1106.4199, pp. 1-25 (Jun. 21, 2011).
Bode, "Behavioral Advertising Could Be Illegal," DSLReports, http://www.dslreports.com/shownews/Behavioral-Advertising-Could-Be-Illegal-94578, 1 page (May 20, 2008).
Boldi et al., "UbiCrawler: A scalable Fully Distributed Web Crawler," Software: Practice and Experience, vol. 34, No. 8, pp. 1-14 (2004).
Borders et al., "Towards Quantification of Network-Based Information Leaks via HTTP," Ann Arbor, pp. 1-6 (2008).
Borges et al., "A Dynamic Clustering-Based Markov Model for Web Usage Mining," arXiv preprint cs/0406032, pp. 1-21 (May 24, 2004).
Borgesius, "Behavioral Targeting Legal Developments in Europe and the Netherlands," W3C Workshop: Do Not Track and Beyond, pp. 1-5 (Nov. 2012).
Bort, "By 2017, We'll Each Have 5 Internet Devices (And More Predictions From Cisco)," The Business Insider, https://web.archive.org/web/20141117110719/http://www.businessinsider.com/cisco-predicts-mobile-2013-5?op=1, pp. 1-33 (May 29, 2013).
Bouch et al., "Quality is in the Eye of the Beholder: Meeting Users' Requirements for Internet Quality of Service," Proceedings of the SIGCHI conference on Human Factors in Computing Systems, pp. 1-9 (Jan. 2000).

(56) References Cited

OTHER PUBLICATIONS

Boyd et al., "Distributed Optimization and Statistical Learning via the Alternating Direction Method of Multipliers," Machine Learning, vol. 3, No. 1, pp. 1-122 (2010).
Brauckhoff et al., "A Signal Processing View on Packet Sampling and Anomaly Detection," Proceedings of IEEE INFOCOM-2010, pp. 1-9, (2010).
Brauckhoff et al., "Impact of Packet Sampling on Anomaly Detection Metrics," Proceedings of the 6th ACM SIGCOMM Conference on Internet Measurement, pp. 1-6 (Oct. 25-27, 2006).
Brodkin, "Netflix packets being dropped every day because Verizon wants more money," arsTechnica, https://arstechnica.com/information-technology/2014/02/netflix-packets-being-dropped- every-day-because-verizon-wants-more-money/, pp. 1-7 (Feb. 21, 2014).
Brodkin, "Netflix performance on Verizon and Comcast has been dropping for months," arsTECHNICA, https://arstechnica.com/information-technology/2014/02/netflix-performance-on-verizon-and-comcast-has-been-dropping-for-months/, pp. 1-7 (Feb. 10, 2014).
Bromberger, "DNS as a Covert Channel Within Protected Networks," National Electronic Sector Cyber Security Organization (NESCO), pp. 1-6 (Jan. 25, 2011).
Bump, "Half of Internet Traffic in North America Is Just to Watch Netflix and YouTube," The Atlantic, https://www.theatlantic.com/technology/archive/2013/05/netflix-youtube-traffic/315290/, pp. 1-3 (May 14, 2013).
Butkiewicz et al., "Understanding Website Complexity: Measurements, Metrics, and Implications," Proceedings of the 2011 ACM SIGCOMM conference on Internet measurement conference, pp. 313-328 (Nov. 2-4, 2011).
Cadez et al., "Model-Based Clustering and Visualization of Navigation Patterns on a Web Site," Data Mining and Knowledge Discovery, vol. 7, No. 4, pp. 1-29 (2003).
Cai et al., "Hierarchical Clustering of WWW Image Search Results Using Visual, Textual and Link Information," Proceedings of the 12th annual ACM international conference on Multimedia, pp. 952-959 (2004).
Cai et al., "Touching from a Distance: Website Fingerprinting Attacks and Defenses," Proceedings of the 2012 ACM Conference on Computer and Communications Security, pp. 1-12 (Oct. 16-18, 2012).
Callahan et al., "A Longitudinal View of HTTP Traffic," Passive and Active Measurement, pp. 1-10 (2010).
Callahan et al., "On Modern DNS Behavior and Properties," ACM SIGCOMM Computer Communication Review, vol. 43, No. 3, pp. 8-15 (Jul. 2013).
Canali et al., "Prophiler: A Fast Filter for the Large-Scale Detection of Malicious Web Pages," Proceedings of the 20th International Conference on World Wide Web, pp. 197-206 (Mar. 28-Apr. 1, 2011).
Carela-Espanol et al., "Is our Ground-Truth for Traffic Classification Reliable?," Passive and Active Measurement, pp. 1-10 (2014).
Chaabane et al., "A Closer Look at Third-Party OSN Applications: Are They Leaking Your Personal Information?," Passive and Active Measurement Conference, pp. 1-11 (Mar. 2014).
Chen et al., "An Economic Analysis of Online Advertising Using Behavioral Targeting," MIS Quarterly, vol. 38, No. 2, pp. 429-449 (Jun. 2014).
Chen et al., "SplitX: High-Performance Private Analytics," ACM SIGCOMM Computer Communication Review, pp. 315-326 (Aug. 12-16, 2013).
Cheng et al., "Actively Predicting Diverse Search Intent from Usser Browsing Behaviors*," Proceedings of the 19th International Conference on World Wide Web, pp. 221-230 (Apr. 26-30, 2010).
Chierichetti et al., "Are Web Users Really Markovian?," WWW 2012—Seesion: Web User Behavioral Analysis and Modeling, pp. 609-618 (Apr. 16-20, 2012).
Chierichetti et al., "Stochastic Models for Tabbed Browsing," Proceedings of the 19th International Conference on World Wide Web, pp. 241-250 (Apr. 26-30, 2010).
Chirgwin, "Mandatory HTTP 2.0 encryption proposal sparks hot debate," The Register, https://www.theregister.co.uk/2013/11/14/http_20_encryption_proposal_sparks_hot_debate/, pp. 1-4 (Nov. 14, 2013).
Cho et al., "Efficient Crawling Through URL Ordering," Seventh International World-Wide Web Conference, pp. 1-20 (Apr. 14-18, 1998).
Cho et al., "The Evolution of the Web and Implications for an Incremental Crawler," Department of Computer Science, Standard, CA pp. 1-18 (Dec. 2, 1999).
Choffnes et al., "Taming the Torrent a Practical Approach to Reducing Cross-ISP Traffic in Peer-to-Peer Systems," ACM SIGCOMM Computer Communication Review, pp. 1-12 (Aug. 17-22, 2008).
Choi et al., "A Behavioral Model of Web Traffic," Seventh International Conference on Network Protocols, pp. 1-8 (1999).
Choi et al., "Web Page Classification," Foundations and Advances in Data Mining, pp. 221-274, (2005).
Christiansen et al., "Tuning RED for Web Traffic," ACM SIGCOMM Computer Communication Review, pp. 139-150 (2000).
Chun et al., "PlanetLab: An Overlay Testbed for Broad-Coverage Services," ACM SIGCOMM Computer Communication Review, vol. 33, No. 3, pp. 1-10 (Jan. 2003).
Claise, "Cisco Systems NetFlow Services Export Version 9," Network Working Group, pp. 1-33 (Oct. 2004).
Homepage, Wireshark, Accessed through Wayback Machine, https://web.archive.org/web/20070102084530/https://www.wireshark.org/, 1 page (2007).
Costa et al., "Evaluating Web Archive Search Systems," 13th International Conference on Web Information System Engineering, pp. 1-15 (Nov. 2012).
Coull et al., "On Web Browsing Privacy in Anonymized NetFlows," USENIX Security, pp. 1-15 (2007).
Crotti et al., "Traffic Classification through Simple Statistical Fingerprinting," ACM SIGCOMM Computer Communication Review, vol. 37, No. 1, pp. 7-16 (Jan. 2007).
Crovella et al., "Self-Similarity in World Wide Web Traffic: Evidence and Possible Causes," IEEE/ACM Transactions on Networking, vol. 5. No. 6, pp. 835-846 (Dec. 1997).
Das et al., "Researcher Homepage Classification using Unlabeled Data," Proceedings of the 22nd International Conference on World Wide Web, pp. 471-482 (May 13-17, 2013).
De Boer et al., "Identifying Explicit Features for Sentiment Analysis in Consumer Reviews," pp. 1-15 (2014).
De Sa, "Spectral Clustering with Two Views," Proceedings of the Workshop on Learning with Multiple Views, 22 nd ICML, pp. 20-27 (2005).
Delort et al., "Enhanced Web Document Summarization Using Hyperlinks," Proceedings of the fourteenth ACM conference on Hypertext and hypermedia, pp. 1-8 (Aug. 26-30, 2003).
Dewes et al., "An analysis of Internet chat systems," Proceedings of the 3rd ACM SIGCOMM conference on Internet Measurement, pp. 1-14 (Oct. 27-29, 2003).
Dharmapurikar et al., "Deep Packet Inspection using Parallel Bloom Filters," Proceedings, 11th Symposium on High Performance Interconnects, pp. 1-8 (2003).
Dhawan et al., "Fathom: A Browser-based Network Measurement Platform," Proceedings of the 2012 ACM Conference on Internet Measurement, pp. 1-14 (Nov. 14-16, 2012).
Ding et al., "A spectral method to separate disconnected and nearly-disconnected Web graph components," Proceedings of the seventh ACM SIGKDD International Conference on Knowledge Discovery and Data Mining, pp. 1-6 (2001).
Djatmiko et al., "Federated Flow-Based Approach for Privacy Preserving Connectivity Tracking," Proceedings of the ninth ACM Conference on Emerging Networking Experiments and Technologies, pp. 429-440 (2013).
Douglis et al., "Rate of Change and other Metrics: a Live Study of the World Wide Web," USENIX Symposium on Internetworking Technologies and Systems, pp. 1-13 (Dec. 1997).
Drago et al., "Inside Dropbox: Understanding Personal Cloud Storage Services," Proceedings of the ACM Conference on Internet Measurement Conference, pp. 1-14 (Nov. 14-16, 2012).

(56) References Cited

OTHER PUBLICATIONS

Dreger et al., "Dynamic Application-Layer Protocol Analysis for Network Intrusion Detection," 15th USENIX Security Symposium, pp. 257-272 (2006).
Dyer et al., "Peek-a-Boo, I Still See You: Why Efficient Traffic Analysis Countermeasures Fail," 2012 IEEE Symposium on Security and Privacy, pp. 332-336 (2012).
Elliott, "GENI—Global Environment for Network Innovations," LCN 2008 Keynote Presentations, pp. 8 (Oct. 15, 2008).
Erman et al., "Identifying and Discriminating Between Web and Peer-to-Peer Traffic in the Network Core," Proceedings of the 16th International Conference on World Wide Web, pp. 883-892 (May 8-12, 2007).
Erman et al., "Semi-Supervised Network Traffic Classification," ACM SIGMETRICS Performance Evaluation Review, vol. 35, No. 1 pp. 1-2 (2007).
Erman et al., "Towards a SPDY'ier Mobile Web?," Proceedings of the ninth ACM conference on Emerging Networking Experiments and Technologies, pp. 1-13 (2013).
Erman et al., "Traffic Classification Using Clustering Algorithms," SIGCOMM'06 Workshops, pp. 1-6 (Sep. 11-15, 2006).
Erman et al., "Understanding the Super-sized traffic of the Super Bowl," Proceedings of the 2013 Conference on Internet Measurement, pp. 1-7 (2013).
Este et al., "On the Stability of the Information Carried by Traffic Flow Features at the Packet Level," ACM SIGCOMM Computer Communication Review, vol. 39, No. 3, pp. 13-18 (Jul. 2009).
Fan et al., "Prefix-preserving IP address anonymization: measurement-based security evaluation and a new cryptography-based scheme," Computer Networks, vol. 46, pp. 253-272 (2004).
Fetterly et al., "A Large-Scale Study of the Evolution of Web Pages," Proceedings of the 12th international Conference on World Wide Web, pp. 669-678 (May 20-24, 2003).
Fielding et al., "Hypertext Transfer Protocol—HTTP/1.1," Network Working Group, RFC 2616, pp. 1-114 (Jun. 1999).
Floyd et al., "Difficulties in Simulating the Internet," IEEE/ACM Transactions on Networking (TON), vol. 9, No. 4 pp. 392-403 (Aug. 2001).
Forney, "The Viterbi Algorithm," Proceedings of the IEEE, vol. 61, No. 3, pp. 268-278 (Mar. 1973).
Fox, "17.4% of Global Web Traffic Comes Through Mobile," Mashable, http://mashable.com/2013/08/20/mobile-web-traffic/#77yIDwZi5gqx, pp. 1-8 (Aug. 20, 2013).
Fraleigh et al., "Packet-Level Traffic Measurements from the Sprint IP Backbone," IEEE Network, vol. 17, No. 6, pp. 6-16 (2003).
Freed et al., "Media Types," Accessed through Wayback Machine https://web.archive.org/web/20151211141414/http://www.iana.org/assignments/media-types/media-types.xhtml, pp. 1-2 (Dec. 11, 2015).
Galletta et al., "Web Site Delays: How Tolerant are Users?," Journal of the Association for Information Systems, vol. 5, No. 1, pp. 1-28 (Jan. 2004).
Gavaletz et al., "In-Browser Network Performance Measurement," W3C Workshop on Web Performance, pp. 1-22 (2012).
Gill et al., "YouTube Traffic Characterization: A View From the Edge," ACM SIGCOMM Internet Measurement Conference, IMC'07, pp. 1-15 (2007).
Gu et al., "BotMiner: Clustering Analysis of Network Traffic for Protocol- and Structure-Independent Botnet Detection," USENIX Security Symposium, pp. 139-154 (2008).
Guha et al., "Characterization and Measurement of TCP Traversal through NATs and Firewalls," Internet Measurement Conference, pp. 199-211 (2005).
Haffner et al., "ACAS: Automated Construction of Application Signatures," Proceedings of the 2005 ACM SIGCOMM Workshop on Mining Network Data, pp. 197-202 (Aug. 22-26, 2005).
Hall, "Correlation-based Feature Selection for Machine Learning," PhD thesis, The University of Waikato, pp. 1-178 (Apr. 1999).
He et al., "Anonymization of Set-Valued Data via Top-Down, Local Generalization," Proceedings of the VLDB Endowment, vol. 2, No. 1, pp. 1-12 (Aug. 24-28, 2009).
He et al., "Web document clustering using hyperlink Structures," Computational Statistics & Data Analysis, vol. 41, pp. 19-45 (2002).
Hedley, "jsoup: Java HTML Parser," https://jsoup.org/, pp. 1-2 (2010).
Hernandez-Campos et al., "Statistical Clustering of Internet Communication Patterns," Computing Science and Statistics, pp. 1-16 (2003).
Hernandez-Campos et al., "Tracking the Evolution of Web Traffic: 1995-2003," 11th IEEE/ACM International Symposium on Modeling, Analysis, and Simulation of Computer and Telecommunication Systems (MASCOTS), pp. 16-25 (Oct. 2003).
Hernandez-Campos, "Generation and Validation of Empirically-Derived TCP Application Workloads," Dissertation, University of North Carolina at Chapel Hill, pp. 1-263 (2006).
Herrmann et al., "Website Fingerprinting: Attacking Popular Privacy Enhancing Technologies with the Multinomial Naïve-Bayes Classifier," Proceedings of the 2009 ACM workshop on Cloud Computing Security, pp. 31-42 (Nov. 13, 2009).
Heydon et al., "Mercator: A scalable, extensible Web crawler," World Wide Web, vol. 2, No. 4, pp. 219-229 (1999).
Hintz, "Fingerprinting Websites Using Traffic Analysis," Privacy Enhancing Technologies, pp. 1-8 (2003).
Hocking et al., "Clusterpath: An Algorithm for Clustering using Convex Fusion Penalties," 28th International Conference on Machine Learning, pp. 1-8 (2011).
"Discriminant Analysis—MATLAB classify," MATLAB, http://www.mathworks.com/help/stats/classify.html, pp. 1-4 (Accessed Nov. 2017).
Huang et al., "Amplifying Limited Expert Input to Sanitize Large Network Traces," IEEE/IFIP 41st International Conference on Dependable Systems \& Networks (DSN), pp. 494-505 (2011).
Huang et al., "Anatomizing Application Performance Differences on Smartphones," Proceedings of the 8th International Conference on Mobile Systems, Applications, and Services, pp. 1-13 (2010).
Ihm et al., "Towards Understanding Modern Web Traffic," Proceedings of the 2011 ACM SIGCOMM Conference on Internet Measurement Conference, pp. 295-312 (Nov. 2-4, 2011).
Iliofotou et al., "Profiling-by-Associationi: A Resilient Traffic Profiling Solution for the Internet Backbone," ACM CoNEXT 2010, pp. 1-12 (Nov. 30-Dec. 3, 2010).
Ilyas et al., "Who are You Talking to? Breaching Privacy in Encrypted IM Networks," IEEE International Conference on Network Protocols (ICNP), Goettingen Germany, pp. 1-10 (2013).
Jacob et al., "PUBCRAWL: Protecting Users and Businesses from CRAWLers," 21st USENIX Security Symposium, pp. 1-16 (2012).
Jansen et al., "Determining the informational, navigational, and transactional intent of Web queries," Information Processing and Management, vol. 44, pp. 1251-1266 (2008).
Jansen et al., "How Are We Searching the World Wide Web?: A Comparison of Nine Search Engine Transaction Logs," Information Processing and Management, vol. 42, No. 1, pp. 248-263 (2006).
John et al., "Analysis of Internet Backbone Traffic and Header Anomalies Observed," Proceedings of the 7th ACM SIGCOMM Conference on Internet Measurement, pp. 1-6 (Aug. 24-26, 2007).
John et al., "deSEO: Combating Search-Result Poisoning," USENIX Security Symposium, pp. 1-15 (2011).
Johnson et al., "Desktop and Mobile Web Page Comparison: Characteristics, Trends, and Implications," Communications Magazine, IEEE, vol. 52, No. 9, pp. 1-14 (2014).
Joumblatt et al., "Characterizing end-host application performance across multiple networking environments," INFOCOM, 2012 Proceedings IEEE, pp. 1-5 (2012).
Jung et al., "DNS Performance and the Effectiveness of Caching," ACM SIGCOMM Internet Measurement Workshop, vol. 10, No. 5, pp. 589-603 (Oct. 2002).
Kahle, "Archiving the Internet," Scientific American, pp. 1-4 (Mar. 1997).
Karagiannis et al, "Transport Layer Identification of P2P Traffic," Proceedings of the 4th ACM SIGCOMM Conference on Internet Measurement, pp. 121-134 (Oct. 25-27, 2004).
Karagiannis et al., "BLINC: Multilevel Traffic Classification in the Dark," ACM SIGCOMM Computer Communication Review, pp. 1-14 (Aug. 21-26, 2005).

(56) References Cited

OTHER PUBLICATIONS

Kim et al., "Internet Traffic Classification Demystified: Myths, Caveats, and the Best Practices," Proceedings of the 2008 ACM CoNEXT Conference, pp. 1-12 (2008).
Kira et al., "A Practical Approach to Feature Selection," Proceedings of the ninth international workshop on Machine learning, pp. 249-256 (1992).
Kiyavash et al., "Multi-flow Attacks Against Network Flow Watermarking Schemes," 17th USENIX Security Symposium, pp. 307-320 (2008).
Koukis et , "On the Privacy Risks of Publishing Anonymized IP Network Traces," Communications and Multimedia Security, pp. 22-32 (2006).
Koukis et al., "A Generic Anonymization Framework for Network Traffic," IEEE International Conference on Communications, ICC'06, pp. 1-8 (2006).
Krishnan et al., "An Empirical Study of the Performance, Security and Privacy Implications of Domain Name Prefetching," IEEE/IFIP 41st International Conference on Dependable Systems \& Networks (DSN), pp. 1-12 (2011).
Kurose et al., "Computer Networking a top-Down Approach," Pearson Education, pp. 1-862 (2012).
Labovitz et al., "Internet Inter-Domain Traffic," ACM SIGCOMM, pp. 75-86 (Aug. 30-Sep. 3, 2010).
Lakhina et al., "Mining Anomalies Using Traffic Feature Distributions," ACM SIGCOMM Computer Communication Review, pp. 217-228 (Aug. 21-26, 2005).
Le Blond et al., "Towards Efficient Traffic-analysis Resistant Anonymity Networks," ACM SIGCOMM Computer Communication Review, pp. 1-12 (Aug. 12-16, 2013).
Le et al., "The Effects of Active Queue Management and Explicit Congestion Notification on Web Performance," IEEE/ACM Transactions on Networking (TON), pp. 1-18 (Dec. 2007).
Le et al., "The effects of active queue management on web performance," Proceedings of the 2003 Conference on Applications, Technologies, Architectures, and Protocols for Computer Communications, pp. 265-276 (Aug. 25-29, 2003).
Leland et al., "On the Self-similar Nature of Ethernet Traffic (Extended Version)," IEEE/ACM Transactions on Networking, vol. 2, No. 1, pp. 1-15 (Feb. 1994).
Leontiadis et al., "Measuring and Analyzing Search-Redirection Attacks in the Illicit Online Prescription Drug Trade," USENIX Security Symposium, pp. 1-17 (2011).
Li et al., "Classifying HTTP traffic in the new age," SIGCOMM'08, pp. 479-480 (Aug. 17-22, 2008).
Li et al., "TrackAdvisor: Taking Back Browsing Privacy from Third-Party Trackers," Passive and Active Measurement, pp. 1-12 (2015).
Lian et al., "Traffic Classification Using Visual Motifs: An Empirical Evaluation," Proceedings of the Seventh International Symposium on Visualization for Cyber Security, pp. 1-9 (2010).
Liao et al., "Decentralized Prediction of End-to-End Network Performance Classes," Proceedings of the Seventh Conference on Emerging Networking Experiments and Technologies, pp. 1-12 (2011).
Liberatore et al., "Inferring the Source of Encrypted HTTP Connections," Proceedings of the 13th ACM Conference on Computer and Communications Security, pp. 1-9 (2006).
Liberatore et al., "Strengthening Forensic Investigations of Child Pornography on P2P Networks," ACM CoNEXT 2010, pp. 1-12 (Nov. 30-Dec. 3, 2010).
Likarish et al., "Obfuscated Malicious Javascript Detection using Classification Techniques," 4th International Conference on Malicious and Unwanted Software (MALWARE), 1-8 (2009).
Lim et al., "Internet Traffic Classification Demystified: On the Sources of the Discriminative Power," ACM CoNEXT 2010, pp. 1-12 (Nov. 30-Dec. 3, 2010).

Lin et al., "Discovering Informative Content Blocks from Web Documents," Proceedings of the eighth ACM SIGKDD International Conference on Knowledge Discovery and Data Mining, pp. 1-9 (2002).
Lin et al., "Hierarchical Web-page Clustering via In-page and Cross-page Link Structures," Advances in Knowledge Discovery and Data Mining, pp. 1-8 (2010).
Lin et al., "The Dual-Sparse Topic Model: Mining Focused Topics and Focused Terms in Short Text," Proceedings of the 23rd International Conference on World Wide Web, pp. 539-550 (Apr. 7-11, 2014).
Liu et al., "Understanding Web Browsing Behaviors through Weibull Analysis of Dwell Time," Proceedings of the 33rd International ACM SIGIR Conference on Research and Development in Information Retrieval, pp. 379-386 (2010).
Liu et al., Wavelet-Based Traffic Analysis for Identifying Video Streams over Broadband Networks, IEEE Global Telecommunications Conference, pp. 1-6 (2008).
Louvel, "Can the rise of SPDY threaten HTTP?," Restlet, http://blog.restlet.com/2011/10/06/can-the-rise-of-spdy-threaten-http/, pp. 1-5 (Oct. 6, 2011).
Luckerson, "Netflix Gets a Speed Boost, Courtesy of Comcast," TIME, http://time.com/96831/netflix-comcast-speeds-get-boost/, 1 page (May 12, 2014).
Luong et al., "Hidden Markov Model Applications in Change-Point Analysis," arXiv preprint arXiv:1212.1778, pp. 1-23 (Dec. 8, 2012).
Ma et al., "A Habit Mining Approach for Discovering Similar Mobile Users," WWW 2012—Session: Mobile and File-sharing Users, pp. 231-240 (Apr. 16-20, 2012).
Ma et al., "Unexpected Means of Protocol Inference," Proceedings of the 6th ACM SIGCOMM Conference on Internet Measurement, pp. 1-13 (Oct. 25-27, 2006).
Mah, "An Empirical Model of HTTP Network Traffic," INFOCOM'97. Sixteenth Annual Joint Conference of the IEEE Computer and Communications Societies, vol. 2, pp. 592-600 (1997).
Maier et al., "On Dominant Characteristics of Residential Broadband Internet Traffic," Proceedings of the 9th ACM SIGCOMM Conference on Internet Measurement Conference, pp. 1-13 (Nov. 4-6, 2009).
Mikians et al., "Crowd-assisted Search for Price Discrimination in E-Commerce: First results, " Proceedings of the 9th ACM Conference on Emerging Networking Experiments and Technologies, pp. 1-6 (Dec. 9-12, 2013).
Miller et al., "I Know Why You Went to the Clinic: Risks and Realization of HTTPS Traffic Analysis," Privacy Enhancing Technologies, pp. 1-28 (Mar. 3, 2014).
Miller et al., "What's Clicking What? Techniques and Innovations of Today's Clickbots," Detection of Intrusions and Malware, and Vulnerability Assessment, pp. 1-20 (2011).
Milling et al., "Network Forensics: Random Infection vs Spreading Epidemic," ACM SIGMETRICS Performance Evaluation Review, pp. 1-12 (Jun. 11-15, 2012).
Moore et al., "The CoralReef Software Suite as a Tool for System and Network Administrators," Proceedings of the 15th USENIX conference on System administration, pp. 133-144 (Dec. 2-7, 2001).
Moore et al., "Internet Traffic Classification Using Bayesian Analysis Techniques," ACM SIGMETRICS Performance Evaluation Review, pp. 1-11 (Jun. 6-10, 2005).
Moore et al.,"Toward the Accurate Identification of Network Applications," Passive and Active Network Measurement, pp. 1-14 (2005).
Motoyama et al., "Dirty Jobs: The Role of Freelance Labor in Web Service Abuse," Proceedings of the 20th USENIX Conference on Security, pp. 1-16 (2011).
Najork et al., "Breadth-First Search Crawling Yields High-Quality Pages," Proceedings of the 10th International Conference on World Wide Web, pp. 114-118 (2001).
Naone, "The Slow-Motion Internet," MIT Technology Review, https://www.technologyreview.com/s/422815/the-slow-motion-internet/, pp. 1-8 (Feb. 22, 2011).
Neasbitt et al., "ClickMiner: Towards Forensic Reconstruction of User-Browser Interactions from Network Traces," Proceedings of

(56) References Cited

OTHER PUBLICATIONS the 2014 ACM SIGSAC Conference on Computer and Communications Security, pp. 1-12 (Nov. 3-7, 2014).
Neilsen et al., "Network Performance Effects of HTTP/1.1, CSS1, and PNG," ACM SIGCOMM Computer Communication Review, pp. 1-20 (Jun. 1997).
Notess, "The Wayback Machine: The Web's Archive," Online—Weston and Wilton, vol. 26, No. 2, pp. 1-4 (Mar./Apr. 2002).
Nychis et al., "An Empirical Evaluation of Entropy-based Traffic Anomaly Detection," Proceedings of the 8th ACM SIGCOMM Conference on Internet Measurement, pp. 1-6 (Oct. 20-22, 2008).
Odlyzko et al., "Internet traffic growth: Sources and Implications," ITCom 2003, pp. 1-15 (2003).
Ohm et al., "Legal Issues Surrounding Monitoring During Network Research (Invited Paper)," Proc. ACM IMC, pp. 1-8 (Oct. 24-26, 2007).
Padhye et al., "Modeling TCP Throughput: A Simple Model and its Empirical Validation," ACM SIGCOMM Computer Communication Review, vol. 28, No. 4, pp. 303-314 (1998).
Paliouras et al., "Clustering the Users of Large Web Sites into Communities," Proceedings of the Seventeenth International Conference on Machine Learning, pp. 1-8 (2000).
Panchenko et al., "Website Fingerprinting in Onion Routing Based Anonymization Networks," Proceedings of the 10th Annual ACM Workshop on Privacy in the Electronic Society, pp. 1-11 (Oct. 17, 2011).
Paxson et al., "Practical Comprehensive Bounds on Surreptitious Communication Over DNS," 22nd USENIX Security Symposium, pp. 17-32 (Aug. 14-16, 2013).
Paxson, "Bro: A System for Detecting Network Intruders in Real-Time," Computer networks, vol. 31, No. 23, pp. 2435-2463 (1999).
Pera et al., "An Unsupervised Sentiment Classifier on Summarized or Full Reviews," Web Information Systems Engineering—WISE 2010, pp. 1-14 (2010).
Phillip, "Half of Internet Traffic in North America Is Just to Watch Netflix and YouTube," https://www.theatlantic.com/technology/archive/2013/05/netflix-youtube-traffic/315290/, pp. 1-3 (May 14, 2013).
Popa et al., "HTTP as the Narrow Waist of the Future Internet," Proc. 9th ACM Workshop on Hot Topics in Networks (Hotnets-IX), pp. 1-6 (Oct. 20-21, 2010).
Qi et al., "Web Page Classification: Features and Algorithms," ACM Computing Surveys, vol. 41, No. 2, Article 12, pp. 12:1-12:31 (Feb. 2009).
Qixiang et al., "Statistical Identification of Encrypted Web Browsing Traffic," IEEE Symposium on Security and Privacy, pp. 1-12 (2002).
Rabiner, "A Tutorial on Hidden Markov Models and Selected Applications in Speech Recognition," Proceedings of the IEEE, vol. 77, No. 2, pp. 257-286 (1989).
Radinsky et al., "Modeling and Predicting Behavioral Dynamics on the Web," WWW 2012, pp. 1-10 (Apr. 16-20, 2012).
Rafiei et al., "Diversifying Web Search Results," Proceedings of the 19th International Conference on World Wide Web, pp. 1-10 (2010).
Rajan et al., "A Large-Scale Active Learning System for Topical Categorization on the Web," Proceedings of the 19th International Conference on World Wide Web, pp. 791-800 (Apr. 26-30, 2010).
Rao et al., "Network Characteristics of Video Streaming Traffic," ACM CoNEXT 2011, pp. 1-12 (Dec. 6-9, 2011).
Reed et al., "Modeling, identifying, and simulating Dynamic Adaptive Streaming over HTTP," 2013 21st IEEE International Conference on Network Protocols (ICNP), pp. 1-2 (2013).
Richardson, "Beautiful Soup Documentation Release 4.4.0," https://media.readthedocs.org/pdf/beautiful-soup/latest/beautiful-soup.pdf, pp. 1-74 (Sep. 3, 2017).
Ringberg et al., "Sensitivity of PCA for Traffic Anomaly Detection," ACM SIGMETRICS Performance Evaluation Review, pp. 109-120 (Jun. 12-16, 2007).
Roesch, "Snort—Lightweight Intrusion Detection for Networks," Proceedings of LISA '99: 13th Systems Administration Conference, pp. 229-238 (Nov. 7-12, 1999).
Roughan et al., "Class-of-Service Mapping for QoS: A Statistical Signature-based Approach to IP Traffic Classification," Proceedings of the 4th ACM SIGCOM Conference on Internet measurement, pp. 1-14 (Oct. 25-27, 2004).
Sanadhya et al., "Asymmetric Caching: Improved Network Deduplication for Mobile Devices," Proceedings of the 18th Annual Iternational Conference on Mobile Computing and Networking, pp. 1-12 (Aug. 22-26, 2012).
Sanders et al., "On the Variation in Web Page Download Traffic Across Different Client Types," 2014 IEEE 22nd International Conference on Network Protocols (ICNP), pp. 1-3 (2014).
Saponas et al., "Devices That Tell on You: Privacy Trends in Consumer Ubiquitous Computing," Usenix Security, pp. 1-16 (2007).
Schatzmann et al., "Digging into HTTPS: Flow-Based Classification of Webmail Traffic," Proceedings of the 10th ACM SIGCOMM Conference on Internet Measurement, pp. 322-327 (Nov. 1-3, 2010).
Schneider et al., "The New Web: Characterizing AJAX Traffic," Passive and Active Network Measurement, pp. 1-10 (2008).
Schneider et al., "Pitfalls in HTTP Traffic Measurements and Analysis," Passive and Active Measurement, pp. 1-10 (2012).
Schneier, "Attacking Tor: how the NSA targets users' online anonymity," The Gaurdian, pp. 1-5 (Oct. 4, 2013).
Schurman et al., "Performance Related Changes and their User Impact," Accessed through Wayback Machine file://jwth-fs-02/folderredirection/pbaig/Desktop/Performance%20Related%20Changes%20and%20their%20User%20Impact.html, pp. 1-3 (Jun. 28, 2009).
Seifert et al., "Identification of Malicious Web Pages with Static Heuristics," Telecommunication Networks and Applications Conference, pp. 1-7 (2008).
Sen et al., "Accurate, Scalable In-Network Identification of P2P Traffic Using Application Signatures," Proceedings of the 13th International Conference on World Wide Web, pp. 512-521 (May 17-22, 2004).
Sen et al., "Analyzing Peer-To-Peer Traffic Across Large Networks," IEEE/ACM Transactions on Networking (ToN), vol. 12, No. 2, pp. 219-232 (Apr. 2004).
Shafiq et al., "A First Look at Cellular Machine-to-Machine Traffic—Large Scale Measurement and Characterization," ACM SIGMETRICS Performance Evaluation Review, vol. 40, No. 1, pp. 1-12 (2012).
Shen et al., "Web-page Classification through Summarization," Proceedings of the 27th annual international ACM SIGIR Conference on Research and Development in Information Retrieval, pp. 242-249 (Jul. 25-29, 2004).
Silveira et al., "ASTUTE: Detecting a Different Class of Traffic Anomalies," ACM SIGCOMM Computer Communication Review, pp. 267-278 (2010).
Siwicki, Nearly a quarter of web traffic is mobile, Internet Retailer, https://www.digitalcommerce360.com/2013/01/09/nearly-quarter-web-traffic-mobile/, pp. 1-2 (Jan. 9, 2013).
Smith et al., "Visually Searching the Web for Content," IEEE multimedia, pp. 12-20 (1997).
Smith et al., "What TCP/IP Protocol Headers Can Tell Us About the Web," Proceedings of ACM SIGMETRICS, pp. 245-256 (Jun. 2001).
Sommer, "Viable Network Intrusion Detection in High-Performance Environments," Dissertation, Lehrstuhl fur¨ Netzwerkarchitekturen, Fakultat fur¨ Informatik, Technische Universitat Munchen, pp. 1-163 (Aug. 29, 2005).
Song et al., "Exploring and Exploiting User Search Behavior on Mobile and Tablet Devices to Improve Search Relevance," Proceedings of the 22nd international conference on World Wide Web, pp. 1201-1212 (2013).
Song et al., "Timing Analysis of Keystrokes and Timing Attacks on SSH," USENIX Security Symposium, USENIX Security Symposium, pp. 1-16 (2001).
Souders, "High performance web sites: essential knowledge for fronted engineers," O'Reilly Ed, pp. 1-146 (2007).

(56) References Cited

OTHER PUBLICATIONS

Soule et al., "Combining Filtering and Statistical Methods for Anomaly Detection," Proceedings of the 5th ACM SIGCOMM Conference on Internet Measurement, UNISEX Association, pp. 331-344 (2005).
Soule et al., "Flow Classification by Histograms or How to Go on Safari in the Internet," ACM SIGMETRICS Performance Evaluation Review, vol. 32, No. 1, pp. 1-12 (Jun. 12-16, 2004).
Spertus, "ParaSite: Mining Structural Information on the Web," Sixth International World Wide Web Conference, pp. 1-13 (Apr. 1997).
Spiliopoulou et al., "A Framework for the Evaluation of Session Reconstruction Heuristics in Web-Usage Analysis," INFORMS Journal on Computing, vol. 15, No. 2, pp. 171-190 (2003).
Sun et al., "StatisticalIdenticationofEncryptedWebBrowsingTracfic," Proc.of IEEE Symposium on Security and Privacy, pp. 1-13 (May 2002).
Tan, "Text Mining: The state of the art and the challenges," Proceedings of the PAKDD 1999 Workshop on Knowledge Disocovery from Advanced Databases, vol. 8, pp. 1-6 (1999).
Tegeler et al., "BotFinder: Finding Bots in Network Traffic Without Deep Packet Inspection," Proceedings of the 8th International Conference on Emerging Networking Experiments and Technologies, pp. 349-360 (2012).
Theurer, "Performance Research, Part 1: What the 80/20 Rule Tells Us about Reducing HTTP Requests," https://yuiblog.com/blog/2006/11/28/performance-research-part-1/, pp. 1-2 (Nov. 28, 2006).
Tibshirani et al., "Sparsity and smoothness via the fused lasso," Journal of the Royal Statistical Society: Series B (Statistical Methodology), vol. 67, Part 1, pp. 91-108 (2005).
Tibshirani et al., "Spatial smoothing and hot spot detection for CGH data using the fused lasso," Biostatistics, vol. 9, No. 1, pp. 18-29 (2008).
Touch et al., "Service Name and Transport Protocol Port Number Registry," The Internet Assigned Numbers Authority (IANA), pp. 1-340 (Oct. 6, 2017).
Trestian et al, "Unconstrained Endpoint Profiling (Googling the Internet)," ACM SIGCOMM Computer Communication Review, vol. 38, No. 4, pp. 279-290 (Aug. 17-22, 2008).
Tscuhiya et al., "Extending the IP Internet Through Address Reuse," ACM SIGCOMM Computer Communication Review, vol. 23, No. 1, pp. 16-33 (1993).
Wang et al., "Automated Web Patrol with Strider HoneyMonkeys: Finding Web Sites That Exploit Browser Vulnerabilities," Proceedings of the 2006 Network and Distributed System Seurity Symposium, pp. 1-15 (2006).
Wang et al., "How Far Can Client-Only Solutions Go for Mobile Browser Speed?," Proceedings of the 21stInternational Conference on World Wide Web, pp. 1-10 (2012).
Wang et al., "How speedy is SPDY?," Proceedings of the 11th USENIX Symposium on Networked Systems Design and Implementation (NSDI '14), pp. 387-399 (Apr. 2-4, 2014).
Wang et al., "On Realistically Attacking Tor with Website Fingerprinting," CACR Seminar, pp. 1-12 (Sep. 2015).
Wang et al., "Walkie-Talkie: An Effective and Efficient Defense against Website Fingerprinting," http://cacr.uwaterloo.ca/techreports/2015/cacr2015-08.pdf, pp. 1-12 (2015).
Wang et al., "Why are Web Browsers Slow on Smartphones?," Proceedings of the 12th Workshop on Mobile Computing Systems and Applications, pp. 1-6 (2011).
Wang et al., "You are How You Click: Clickstream Analysis for Sybil Detection," 22nd USENIX Security Symposium, pp. 1-15 (2013).
Weigle et al., "Tmix: A Tool for Generating Realistic TCP Application Workloads in ns-2," ACM SIGCOMM Computer Communication Review, vol. 36, No. 3, pp. 1-10 (2006).
Weinberger et al., "Feature Hashing for Large Scale Multitask Learning," Proceedings of the 26th Annual International Conference on Machine Learning, pp. 1-8 (Feb. 27, 2009).
White et al., "Clear and Present Data: Opaque Traffic and its Security Implications for the Future," NDSS, The Internet Society, pp. 1-16 (2013).
White et al., "Phonotactic Reconstruction of Encrypted VoIP Conversations: Hookt on fon-iks," IEEE Symposium on Security and Privacy (SP), pp. 3-18 (2011).
Whoriskey, "Every Click You Make," Washingtonpost.com, http://www.washingtonpost.com/wp-dyn/content/article/2008/04/03/AR2008040304052.html, pp. 1-2 (Apr. 4, 2008).
Willinger et al., "Self-Similarity Through High-Variability: Statistical Analysis of Ethernet LAN Trac at the Source Level," IEEE/ACM Transactions on Networking, vol. 5, No. 1, pp. 71-86 (Apr. 15, 1997).
Wright et al., "On Inferring Application Protocol Behaviors in Encrypted Network Traffic," Journal of Machine Learning Research, vol. 7, pp. 2745-2769 (Dec. 2006).
Wustrow et al., "Internet Background Radiation Revisited," Proceedings of the 10th ACM SIGCOMM Conference on Internet Measurement, pp. 1-14 (2010).
Xie et al., "ReSurf: Reconstructing Web-Surfing Activity From Network Traffic," IFIP Networking Conference, pp. 1-14 (2013).
Xie et al., "SubFlow: Towards Practical Flow-Level Traffic Classification," 31st Annual IEEE International Conference on Computer Communications: Mini-Conference, pp. 2541-2545 (2012).
Xu et al., "Identifying Diverse Usage Behaviors of Smartphone Apps," ACM SIGCOMM conference on Internet Measurement Conference, pp. 329-344. (Nov. 2-4, 2011).
Xu et al., "Network-Aware Behavior Clustering of Internet End Hosts," IEEE INFOCOM 2011, 2078-2086 (2011).
Yan et al, "Argus: End-to-End Service Anomaly Detection and Localization From an ISP's Point of View," 2012 Proceedings IEEE INFOCOM, pp. 1-6 (2012).
Yan et al., "How much can Behavioral Targeting Help Online Advertising?," WWW 2009 Madrid, pp. 261-270 (Apr. 20-24, 2009).
Yen et al., "Browser Fingerprinting from Coarse Traffic Summaries: Techniques and Implications," Detection of Intrusions and Malware, and Vulnerability Assessment, pp. 157-175 (2009).
Zeng et al., "Automatic Test Packet Generation," Proceedings of the 8th International Conference on Emerging Networking Experiments and Technologies, pp. 241-252 (Dec. 10-13, 2012).
Zhang et al., "Sparse Online Topic Models," Proceedings of the 23rd International Conference on World Wide Web, pp. 1-11 (2014).
Zhou et al,"The Impact of YouTube Recommendation System on Video Views," Proceedings of the 10th ACM SIGCOMM Conference on Internet Measurement, pp. 404-410 (Nov. 1-3, 2010).
Zou et al, "Regularization and variable selection via the elastic net," Journal of the Royal Statistical Society: Series B (Statistical Methodology), vol. 67, Part 2, pp. 301-320 (2005).
"NebuAd—Discover Insight Media Solutions," www.Nebuad.com, Accessed through Wayback machine http://web.archive.org/web/20090131052204/http://nebuad.com:80/solutions, p. 1 (Jan. 31, 2009).
McGregor et al., "Flow Clustering Using Machine Learning Techniques," Passive and Active Network Measurement, pp. 205-214 (2004).
Schröter, "Client-side Performance Optimizations," Computer Science and Media Stuttgart Media University, http://www.slideshare.net/jakob.schroeter/clientside-web-performance-optimization, pp. 1-26 (Jan. 2011).
Chen et al., "Dynamic Mining for Web Navigation Patterns Based on Markov Model," Computational and Information Science, pp. 806-811 (2004).
Chen et al., "Web Page Genre Classification," Proceedings of the 2008 ACM Symposium on Applied Computing pp. 2353-2357 (2008).
Gallagher et al., "Link Homophily in the Application Layer and its Usage in Traffic Classification," Proceedings of IEEE Infocom-2010, pp. 1-5 (2010).
Gangam et al., "Pegasus: Precision Hunting for Icebergs and Anomalies in Network Flows," 2013 Proceedings IEEE Infocom, pp. 1420-1428 (2013).

(56) References Cited

OTHER PUBLICATIONS

Hua et al., "Modeling and Containment of Search Worms Targeting Web Applications," Detection of Intrusions and Malware, and Vulnerability Assessment, pp. 183-199 (2010).

Iwai et al., "Sentence-based Plot Classification for Online Review Comments," 2014 IEEE/WIC/ACM International Joint Conferences on Web Intelligence (WI) and Intelligent Agent Technologies (IAT), vol. 1, pp. 245-253 (Oct. 20, 2014).

Kahle, "Preserving the Internet," Scientific American, vol. 276, Issue 3, pp. 82-83 (Mar. 1997).

Maciá-Fernandez et al., "ISP-Enabled Behavioral Ad Targeting without Deep Packet Inspection," INFOCOM, 2010 Proceedings IEEE, pp. 1-9 (Mar. 14-19, 2010).

Moshfeghi et al., "On Cognition, Emotion, and Interaction Aspects of Search Tasks with Different Search Intentions," Proceedings of the 22nd International Conference on World Wide Web, pp. 931-941 (May 13-17, 2013).

Newton et al., "The Continued Evolution of Web Traffic," IEEE/ACM International Symposium on Modelling, Analysis and Simulation of Computer Telecommunications Systems, pp. 80-89 (2013).

Shen et al., "On Detection Accuracy of L7-filter and OpenDPI," 2012 Third International Conference on Networking and Distributed Computing (ICNDC), pp. 119-123 (Oct. 21-24, 2012).

Uceda et al., "Selective capping of packet payloads for network analysis and management," Traffic Monitoring and Analysis, pp. 1-16 (2015).

Wu et al., "On the Growth of Internet Application Flows: a Complex Network Perspective," IEEE INFOCOM 2011, pp. 2096-2104 (2011).

Page et al., "The PageRank Citation Ranking: Bringing Order to the Web," Proceedings of the 7th International World Wide Web Conference, Brisbane, Australia, pp. 1-17 (Jan. 29, 1998).

\* cited by examiner

METHODS, SYSTEMS, AND COMPUTER READABLE MEDIA FOR GENERATING AND USING A WEB PAGE CLASSIFICATION MODEL

PRIORITY CLAIM

This application claims the benefit of U.S. Provisional Patent Application Ser. No. 62/104,052, filed Jan. 15, 2015; the disclosure of which is incorporated herein by reference in its entirety.

TECHNICAL FIELD

The subject matter herein generally relates to web page classification, and more particularly, to methods, systems, and computer readable media for generating and using a web page classification model to make various types of predictions.

BACKGROUND

The Transmission Control Protocol (TCP) and the Internet Protocol (IP) are used to transmit data packets in a network between a sender and a receiver. Data packets include TCP/IP headers, which identify the respective source and destination addresses. It is desirable for TCP/IP headers to be anonymized for protecting a client's privacy.

Currently, anonymized TCP/IP headers may be used to identify the application layer protocol for determining whether a web page is Hypertext Transfer Protocol (HTTP) or non-HTTP. However, this information alone is not very informative.

Anonymized TCP/IP headers may also be used for identifying specific web pages. However, these types of identification methods are limited by resource constraints and do not scale well.

Deep packet inspection approaches are used for various purposes such as examining the payload part of a packet as it passes an inspection point, searching for protocol, non-compliance, viruses, spam, intrusions, or defined criteria to decide whether the packet may pass or if it needs to be routed to a different node. However, such methods are not robust enough to accommodate obfuscated traffic (i.e., encrypted or compressed), rendering this methodology infeasible.

Accordingly, a need exists for methods, systems, and computer readable media for generating and using a web page classification model. Such a web page classification model has a wide range of applicability, not limited to use in predicting network traffic for network planning, identifying security breaches (e.g., web crawlers, malicious bots, etc.), profiling web page content for advertisement targeting, profiling the usage of mobile devices, profiling application type, profiling navigation styles, etc.

SUMMARY

Methods, systems, and computer readable media for generating and using a web page classification model are disclosed. In one exemplary embodiment, a method of generating and using a web page classification model is described. The method includes identifying a plurality of web pages for use in generating a web page classification model, assigning a label to each of the plurality of web pages, accessing, by a processor, Transmission Control Protocol/Internet Protocol (TCP/IP) traffic traces associated with downloading content from each of the plurality of web pages, processing, by the processor, TCP/IP headers from the TCP/IP traffic traces to identify and extract features that discriminate between the labels, that are uncorrelated and whose discriminatory accuracy remains stable across time and/or browser platform, and generating, by the processor, a web page classification model by training a model trainer to learn a combination of the features that accurately discriminates between the labels, that includes uncorrelated features, and that remains stable across time and/or browser platform. The model is usable to classify unlabeled web pages when applied to TCP/IP traffic traces used to access the unlabeled web pages.

In one exemplary embodiment, a system for generating a web page classification model comprises a processor for accessing Transmission Control Protocol/Internet Protocol (TCP/IP) traffic traces associated with downloading content from a plurality of web pages and processing TCP/IP headers from the TCP/IP traffic traces, a web page classification model generator executed by the processor for generating a web page classification model. The web page classification model generator can comprise a labeler for assigning a label to each of the plurality of web pages, a feature extractor for identifying and extracting features from the processed TCP/IP headers that discriminate between the label, the features being uncorrelated and whose discriminatory accuracy remains stable across time and/or browser platform, and a model trainer for generating the web page classification model by learning a combination of the features that accurately discriminates between the labels, that includes uncorrelated features, and that remains stable across time and/or browser platform. The generated model is usable to classify unlabeled web pages for a variety of different applications, not limited to profiling applications, security applications, forecasting applications, and targeted advertising applications.

The subject matter described herein may be implemented in hardware, software, firmware, or any combination thereof. As such, the terms "function" "computing platform" and "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps.

Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single computing platform or may be distributed across multiple computing platforms.

BRIEF DESCRIPTION OF THE DRAWINGS

The subject matter described herein will now be explained with reference to the accompanying drawings of which.

DETAILED DESCRIPTION

Figure 1A:
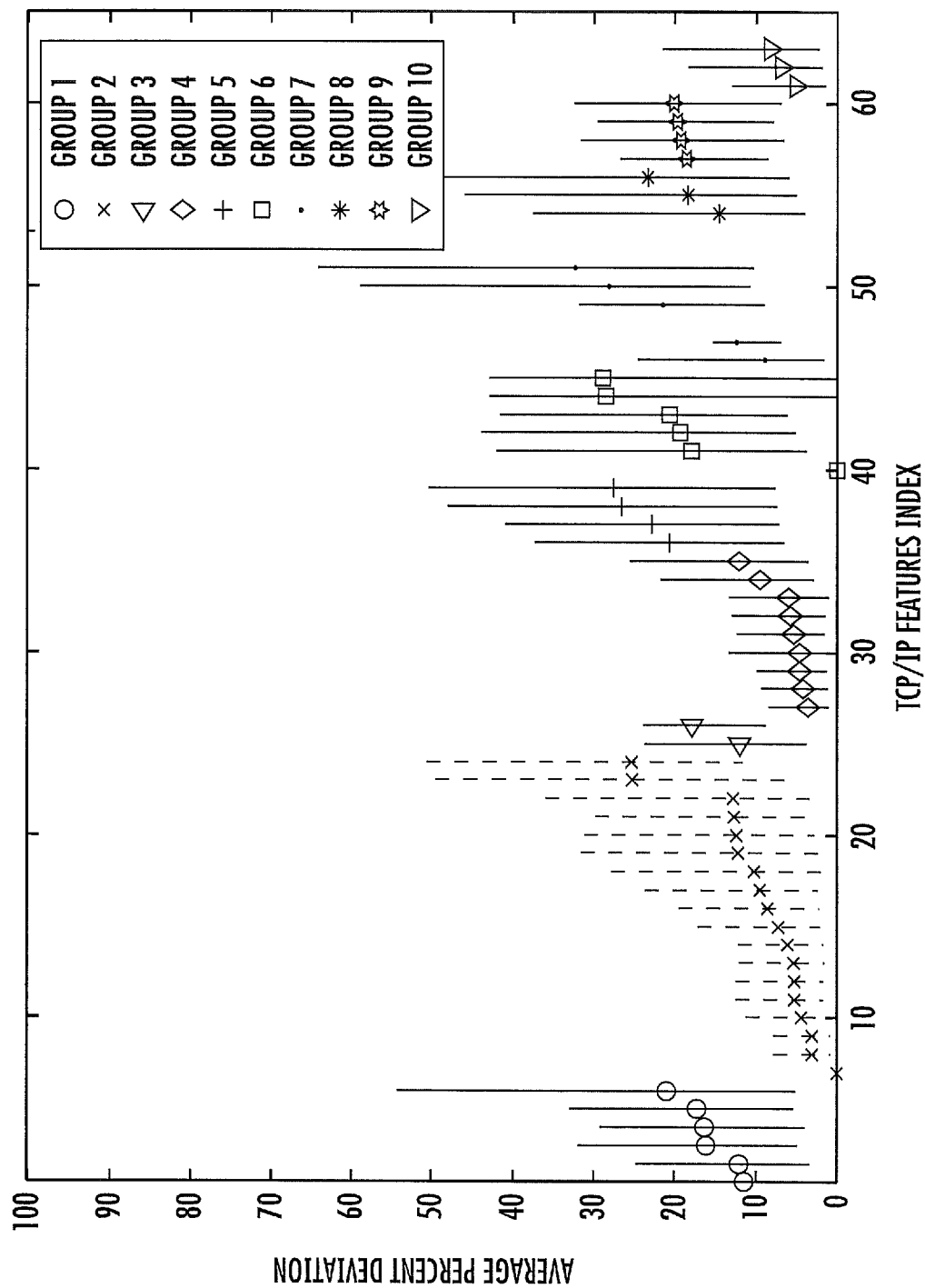
FIGS. 1A and 1B are graphical illustrations of the respective stability and consistency associated with various exemplary groupings of informative features extracted from TCP/IP traces for use in generating a web page classification model according to the disclosure herein.

Web page classification is useful in many domains not limited to targeted advertising, traffic modeling, and intrusion detection. The subject matter herein describes learning-based techniques used to classify web pages based only on anonymized TCP/IP headers of traffic generated when a web page is visited. This may be accomplished in three steps. First, informative TCP/IP features can be selected for a given downloaded web page, and studied for determining which of the features remain stable over time and consistent across client browser platforms. Second, the selected features can be used to evaluate at least four different labeling schemes and learning-based classification methods for web page classification. Lastly, the effectiveness of the classification methods can be empirically studied for real-world applications.

As used herein, the term "anonymized" refers to packet headers in which the IP addresses of the clients are changed to sequences that cannot be traced back to an original source or client.

As used herein, the term "classifying" a web page refers to predicting various aspects relating to the web page, for example, as set forth in Table I below. Classifying a web page may refer to predicting a content genre of the web page (e.g., shopping, business, news, etc.), predicting whether the web page is a video page or non-video page, classifying the type of device accessing the web page, and/or predicting the navigation used to access the web page.

I. Applicability of Web Page Classification

The World Wide Web (WWW) is the most popular application on the Internet and HTTP accounts for 80% of Internet traffic [20, 16]. Studying the types of web pages being downloaded by clients has tremendous utility in several domains not limited to the four specific examples described below.

Profiling the content type of a web page: The content of web pages can typically be classified or categorized into (e.g., generic) genres such as Finance, Shopping, News, Education, Automobiles, etc., or the like [34, 31]. Knowledge of the genre of web pages downloaded by a given user can be used for gauging user interest, which is invaluable for delivery of personalized content and targeted advertisements thereto [32]. For instance, some service providers rely on deep packet inspection of packets to assess what type of content consumers are interested in, for the purpose of delivering ads [42].

Profiling the usage of video streaming (application type): Video streaming is now reported to occupy nearly 50% of network bandwidth, and consumption is expected to grow [36, 37]. The ability to distinguish between bandwidth-hungry video and non-video streams at critical traffic aggregation points can help facilitate better planning and control. For instance, a campus network manager may be able to prevent network abuse and/or rate-limit video streams destined for student dorms; researchers may want to build profiles of enterprise video traffic to facilitate traffic modeling and forecasting studies; or perhaps Internet service providers may desire limiting resources per business interests [41].

Profiling the usage of mobile devices: The average number of devices per Internet user is estimated to grow to five (5) by 2017 [35]—most of these are mobile devices. The ability to identify web page downloads targeted for mobile devices can help in: (i) building profiles of mobile web usage within an enterprise (for capacity planning, modeling, and forecasting purposes), and (ii) delivering personalized content and advertisements that are customized for constrained displays, power, and connectivity.

Profiling the navigation-style for web browsing: The way users navigate through web pages can be classified as accessing either a landing page (home page), clickable content (non landing pages), or with the increasing use of search and recommendation engines, search results. Such a navigation-based classification can be useful for identifying network misuse. For instance, web crawlers are misused for purposes of web page scraping [14]. Recent studies have shown that the pattern of web page navigation from a given end-point can help identify the corresponding malicious bots [27, 28].

The subject matter herein describes, for example, how web page downloads can be classified according to genre, or any other dimensions noted above, using only anonymized TCP/IP headers that appear in the corresponding network traffic. Notably, the components and functionality described herein constitute a special purpose test node or platform that improves the technological field of classifying web pages using anonymized TCP/IP header information only, without the need to examine a packet payload.

Modeling via anonymized TCP/IP headers is useful to entities not having a direct access to client-side or server-side end-points (e.g., Internet service providers or enterprise network administrators). Currently, such entities must monitor access links and conduct deep-packet inspection of the network traffic generated by client-server interactions [2, 42, 1]. For instance, signature- and keyword-based approaches that scan the HTTP headers and payload for identifying web page types [2, 31], which are problematic as being resource and labor intensive. Notably, methods, systems, and computer readable media described herein obviate the need to investigate packet payloads.

Recent studies have shown, however, that nearly 86% of traffic today is obfuscated (either encrypted or compressed) [30], which makes deep packet inspection practically infeasible—this situation is likely to worsen with the advent of default encryption in HTTP 2.0 [39]. Furthermore, strong Internet privacy legislation dictates that Internet Service Providers and network managers may access no more than anonymized TCP/IP headers in the traffic [38]. Anonymized headers refer to those in which the IP addresses of the clients are changed to sequences that cannot be traced back to the originals. This is a significant challenge because most monitoring approaches rely on application-specific information. In contrast, the content in anonymized TCP/IP headers directly reveals nothing more about the application, other than the fact that it is using HTTP. Even the HTTP headers themselves are unavailable. It is, consequently, imperative to use and/or model anonymized TCP/IP headers for mining and gathering information for the purpose of classifying the corresponding web page downloads. The subject matter herein provides model generation and usage relying on learning-based classification to address web page classification, in the context of the four labeling dimensions noted above.

Classifying traffic based on the type of web pages has not been considered before and is a challenging domain due to the tremendous diversity of web pages and browsers as well as the significant complexity of multi-flow web page downloads [22]. More fundamentally, it is not even clear if the type of a web page would influence the TCP/IP features at all. This issue was studied by making the following key contributions:

1. Data collection: Five different modern browser platforms were used to conduct and analyze downloads of 3345 web pages, all belonging to the top-250 most popular web sites. Overall, more than 100,000 web page downloads were analyzed. For each download, TCP/IP data was processed and the ground-truth was collected regarding the type of the corresponding web page, based on the four classification schemes.

2. Feature extraction and selection: TCP/IP headers were processed to derive 216 features, including temporal and multi-flow features as well as the respective statistical derivatives. A systematic analysis of these features was conducted to identify robust and discriminatory features. In view of conventional studies, this is the first work that argues for and considers consistency (across different browser platforms) and stability (over time) in selecting robust features for web page classification and use in a web based classification model.

3. Web page classification: Using the selected robust features, an evaluation of how effectively these may be used to classify web page downloads according to each of the four diverse labeling schemes. The four diverse labeling schemes (also referred to as "categories") noted above include mobile-targeted downloads, video downloads, genre-based downloads, and navigation-based downloads. It is found that while mobile-targeted and video downloads can be classified using a K-Nearest Neighbor (KNN) algorithm with more than 90% accuracy, the genre- and navigation-based categories can be classified with a somewhat lower accuracy.

4. Applicability of classification: The impact of this work was then evaluated on two application domains, for exemplary purposes only. The first is that of traffic modeling, in which the distributions of (i) traffic modeling parameters, as well as (ii) properties of the generated traffic were studied. These are statistically indistinguishable from distributions derived using ground-truth labels. The second application studied is that of building user-browsing profiles (for targeted advertisements and clickbot detection). It was found that the genre-preference of a random synthetic Internet user can be reconstructed with more than 80% accuracy, based on the classified labels.

The results of the studies are presented and described herein in Section II; feature selection, classification, and applicability study in Sections III-V. Section VI includes feature groupings.

II. Data Collection Methodology

Figure 6:
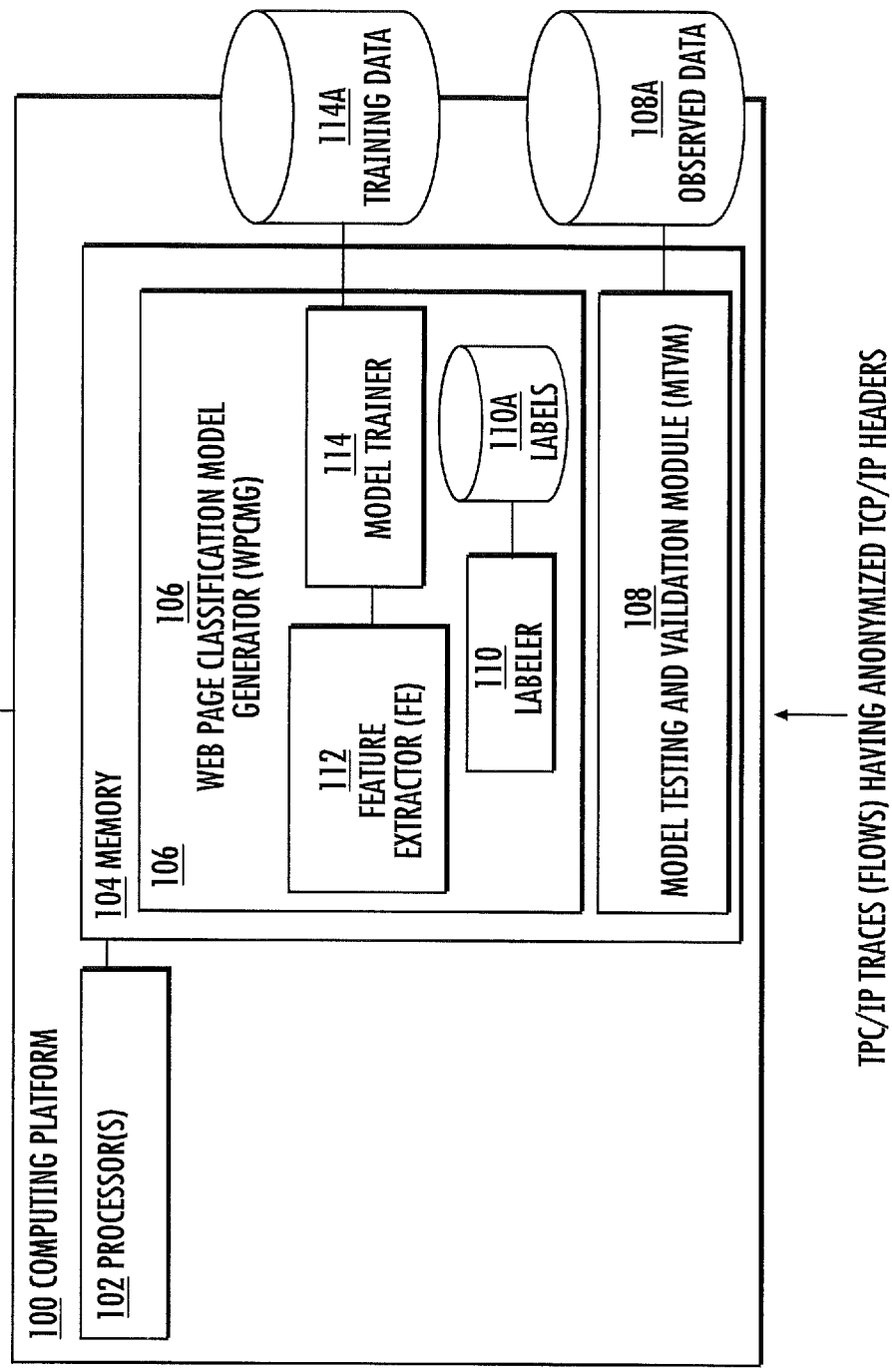
FIG. 6 is a block diagram of an exemplary system for generating and using a web page classification model according to the disclosure herein.

Learning-based classification requires correctly-labeled ground-truth data for training the classifiers (e.g., model trainer 114, FIG. 6). Below is described a methodology for selecting, labeling, and downloading web pages, as well as extracting TCP/IP features. Of note, web page classification using TCP/IP traces first includes identifying which set of TCP flows correspond to a given web page download—such web page boundary detection has received prominent interest in recent literature [18, 13, 19] and is beyond the scope of this paper. This application focuses on, once web page boundaries have been detected, how effectively can the anonymized TCP/IP headers be used to classify the type of the web page?

Studies focused on the top 250 web sites (web pages) from [34]—as some studies have suggested that nearly 99% of web traffic originates from just these 250 web sites used in this study. Each of the 250 web sites was browsed to collect a list of URLs for respective landing pages, as well as non-landing pages, including search results and media content. This methodology does not capture the fact that some websites present different landing pages to users who are logged in (e.g., facebook.com). Overall, the study included a list of 3345 web pages.

Ground-truth Labels: Labels were also assigned to each web page (Table I), according to the four labeling schemes as follows. (1) AGL: A content-genre based label is assigned to each web page, using the top-level Alexa genre for the corresponding web site (the four (4) most common labels are listed in Table I). (2) WNL: A navigation-based label is assigned based on whether the web page was the landing page, a search-result page (obtained by entering random keywords in a search box), or a clickable content page (including news articles, video content, and social networking pages). Of note, there may be several homepages per web site—e.g., www.yahoo.com, and www.finance.yahoo.com, each of which is classified as a landing page. (3) VSL: The video-streaming (vs. non-video streaming) label is assigned to web pages where a video has played—this includes samples from top video streaming providers like NETFLIX™, YOUTUBE™, and HULU™. The non-video category also SOUNDCLOUD™ and PANDORA™), and file transfer sites with large files (DROPBOX™ and THEPIRATEBAY™). (4) TDL: The final set of labels corresponds to mobile-optimized or traditional pages. This includes only mobile web pages having a traditional web page that serves the same content (e.g., a Super Bowl article on bleacherreport.com that also appears on its mobile web site).

TABLE I

DISTRIBUTION OF CLASS LABELS

| Labeling Scheme | Class Names | # Web Pages |
|---|---|---|
| Video Streaming (2 Classes) | Video page | 169 (5.05%) |
| | Non-Video page | 3176 (94.95%) |
| Targeted Device (2 Classes) | Traditional page | 2481 (74.17%) |
| | Mobile optimized page | 864 (25.83%) |
| Alexa Genres (18 Classes) | Computers | 821 (24.54%) |
| | Shopping | 375 (11.21%) |
| | Business | 363 (10.82%) |
| | News | 320 (9.57%) |
| | Other 14 classes | 1466 (43.86%) |
| Web page Navigation (3 Classes) | Clickable content page | 1505 (44.99%) |
| | Search result page | 1226 (36.65%) |
| | Landing page | 614 (18.36%) |

TABLE II

BROWSER USAGE STATISTICS [27]

| Chrome | Internet Explorer | Firefox | Safari | Opera |
|---|---|---|---|---|
| 42.09% | 25.32% | 20.58% | 9.49% | 2.52% |

Trace Collection: The TCP/IP trace generated by the download of a given web page may differ across client browser platforms [11]. In order to make classifications herein robust to the browser platform, each of the 3345 pages was loaded using five (5) different modern browsers listed in Table II above to determine the consistency of each TCP/IP feature across browsers (Table II). The five (5) browsers were Internet Explorer (IE) version 9.0.8112.16502, Firefox version 23.0.1, Google Chrome version 29.01547.66m, Safari version 5.1.7, and Opera version 12.16—as run on a modern Windows 7 desktop. Apple does not support Safari on Windows. Thus, the version of Safari used for this study is outdated compared to the version used on OSX.

Web pages are also updated over time [13] in order to study which TCP/IP features remain stable over time for a given web page, and was repeated for the above 3345×5 downloads 6 times each, over a period of 20 weeks and resulted in 100,350 web downloads.

TCP/IP traces are automatically collected for each download as:
1. Start packet capture tool
2. Start a browser with a web page URL as an argument
3. Close the browser and packet capture tool after 120 seconds
4. Clear the local DNS resolver and browser cache
5. Go to Step 1 using a new URL Quantitative Feature Extraction: Access to the TCP/IP traffic traces allows extraction of many bidirectional traffic features—such as the number of PUSH flags or the size of the HTTP objects transmitted in a TCP connection—that are not available from other sources such as netflow logs. The download of each web page itself may be simulated using TMIX, which provides a source-level traffic generation interface in ns-2 [29].

The methodology herein also allows adding multi-flow features that span the multiple TCP transfers characterizing a given page download—[for instance, the number of TCP connections, number of distinct IP-pairs used, flow inter-arrival times, and total number of packets and bytes transmitted]. Also included are fine-scale temporal features such as round-trip time (RTT) and inter-epoch (inter-object) arrival times. Further included are statistical derivatives—such as the minimum, maximum, and several percentiles—of the occurrence of a given feature. In total, at least 216 quantitative features can be extracted for processing.

III. Feature Selection

The success of classification models relies on the selection of informative, uncorrelated, and robust features [12]. Prior traffic classification studies focused on the first two properties by using automated correlation-based feature selection algorithms (e.g., [17])—robustness of features has not been considered before. Given the diversity and dynamism present in the Internet (and especially in the World Wide Web); this is a rather serious issue [10, 5, 6]. Specific to goals of the subject matter herein, it is important to consider the impact of at least two factors: The impact of client location was not considered, as some recent studies show that location does not significantly impact basic web page features (for Firefox) [3], or that TCP/IP features that are informative for application protocol classification do not vary significantly across location [9].

Time: Modern web pages may change several times a day [10]. It is important to study how this impacts the stability over time of the TCP/IP features generated when the page is downloaded—indeed, classifiers trained on features that are stable over time are more likely to perform well on unseen data and do not need to be retrained often.

Browsers: Client browser platforms differ in their configurations and may generate different TCP/IP features when downloading the same web page (e.g., depending on the extent to which they use pipelining). It should be noted which features are consistent (similar) across different browsers—else, classifiers trained on one browser will not perform well on unseen data that may have been generated by a different browser.

In order to incorporate the above aspects, a 3-step process for feature selection may be used: (i) identify a set of most informative features for web page classification; (ii) group the most informative features into subsets of highly correlated features; and (iii) select the most stable (over time) and consistent (across browsers) features from each of the above subsets. These steps are described below.

In what follows, for each feature i, let $M_{n,b,t}^i$ represent a N×B×T matrix populated with measurements of feature i across the N (=3345) number of web pages, B (=5) number of browsers, and T (=6) repeated web page downloads over time.

Identifying and Grouping Informative Features: For selecting informative features, noise due to browser selection or time of measurement is minimized by computing the average of the B×T measurements of a feature for a given web page. The RELIEF method [12] was used to rank the 216 averaged features according to a respective ability to classify the 3345 web pages. The top 40 (~top 20%) most informative features for each of the four labeling schemes was selected—of the total 160 features, only 63 were found to be unique (many features were informative for multiple labeling schemes).

The 63 features can be grouped into correlated subsets. For this, the Pearson correlation, p, was used to identify 10 groups of highly correlated features (listed in Section VI). The features within each group have $\rho \geq 0.75$, whereas the correlation between features from different groups is generally less than 0.3.

Feature Stability: Next, an estimation of how stable these 63 features are over time was performed. For each feature i, to control for the effect of different client browsers, a N×T matrix is defined as: $S_{n,t}^i = \Sigma_b w(b) M_{n,b,t}^i$, where $w(b) \in [0,1]$ represents the usage fraction for browser b (Table II), which helps ensure that the analysis is representative of real-world web traces.

The stability over time for each feature i and web page n is then estimated by computing the average percent deviation metric defined as:

$$DS_n^i = 100 \cdot \frac{\sum_{t=1}^{T} |S_{n,t}^i - \mu_n^i|}{T \mu_n^i} \quad (1)$$

where, $$\mu_n^i = \frac{\sum_t S_{n,t}^i}{T}.$$

For each feature i, the median, 10- and 90-percentile values of the deviation $DS_n^i$ observed across the 3345 web pages are extracted, and these values are plotted as illustrated by FIG. 1A. The features are first grouped according to the 10 correlated subsets, and then sorted according to the median value of $DS_n^i$. Section VI lists these features in the same order.

Figure 1B:
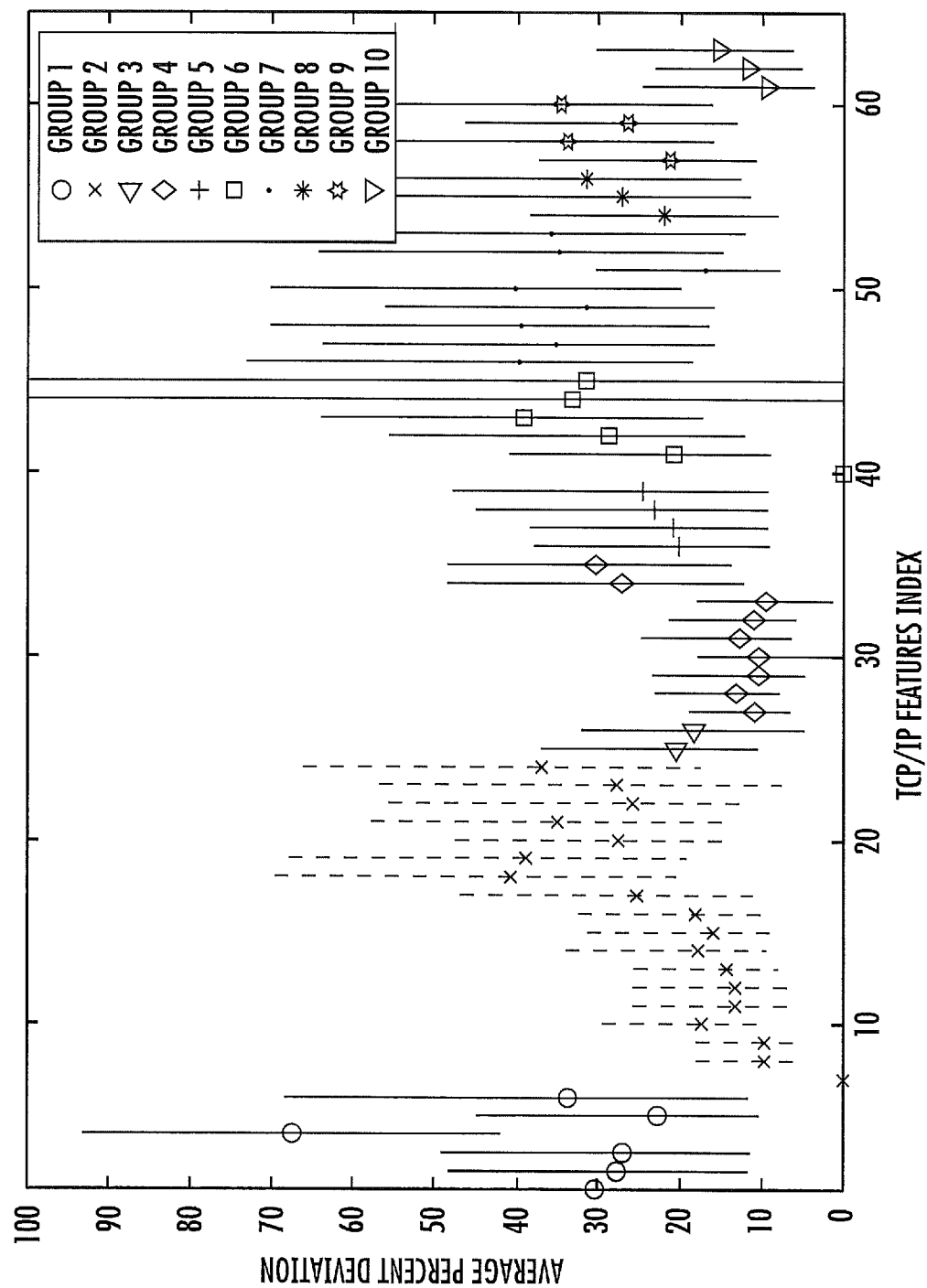

FIGS. 1A and 1B illustrate the stability and consistency, respectively, for features in groups 1 to 10.

Feature Consistency: A similar formulation is used to estimate the consistency across browsers for each feature i and web page n by computing a corresponding average percent deviation as:

$$DC_n^i = 100 \cdot \frac{\sum_{b=1}^{B} w(b)|C_{n,b}^i - v_n^i|}{v_n^i} \quad (2)$$

where, $$C_{n,b}^i = \frac{\sum_t M_{n,b,t}^i}{T}$$

is a N×B matrix, each element of which represents the average measurement of feature i when browser b downloads web page n repeatedly; and $v_n^i = \Sigma_b w(b) C_{n,b}^i$.

FIG. 1B graphically illustrates the median, 10- and 90-percentile values of $DC_n^i$ observed across the 3345 web pages—the x-axis uses the same feature index as FIG. 1A.

Selection of Robust Features: In an exemplary embodiment, the plots illustrated in FIGS. 1A and 1B were used to select the most time agnostic and browser agnostic features from each of the 10 groups of correlated features. Sample groups of correlated features are provided in Section VI. By comparing the two plots, it is found that the median, 10- and 90-percentile deviations for nearly all features in the feature consistency plot are larger than the corresponding values in the feature stability plot. This implies that the TCP/IP features generated by the download of a given web page vary more across client browser platforms than over time. A deeper analysis reveals that the primary deviation between traffic between browsers is ad and tracking services, which are browser specific [22].

Although most of the selected features vary significantly across browsers, some features vary much more across browsers than others. For example, feature 4, Number of Bidirectional Reset flags, is relatively stable over time like other features within its group (Group 1). However, this feature changes much more dramatically across browsers. Based on the above, 10 features can be selected as robust, informative, and uncorrelated as discussed below.

Exemplary Informative Features

Figure 2:
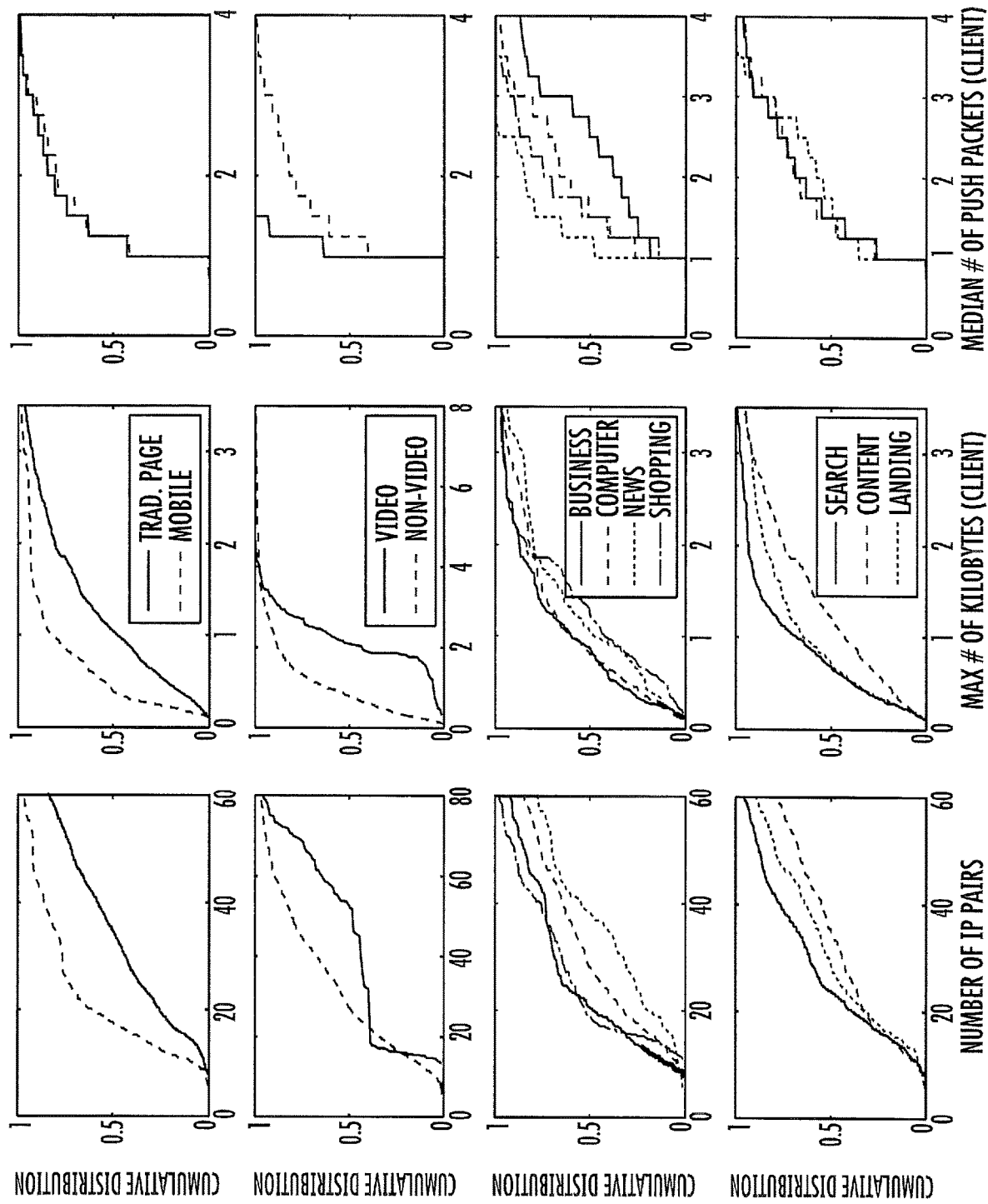
FIG. 2 is a graphical illustration of the discriminatory power of non-temporal features for determining the most exemplary informative features for use in generating a web page classification model according to the disclosure herein.

Number of servers contacted: The total number of distinct servers contacted for downloading a web page is discriminatory for several classes across the two labeling schemes (see e.g., FIG. 2). FIG. 2 is a graphical illustration of the discriminatory power of non-temporal features. It is found that mobile optimized web pages contact a significantly less number of servers—this is presumably because they are designed for devices with constrained resources.

Video pages were also found to contact more servers than non-video pages—these extra servers correspond to increased number of ads, images, and comment boxes. This is especially true for YOUTUBE™ pages, which establish around 400 TCP connections (whereas NETFLIX™ uses 60 connections). Search results also generally display less content from multiple servers than do clickable content pages.

In the genre-based category, it was found that News pages contact significantly more number of servers than other classes—this was also previously observed in [3], and is presumably because News sites tend to summarize on the same page different types of topics (sports, weather, finance, etc.).

Number of PUSH flags per TCP connection: The maximum number of push packets sent in a TCP connection for a given web page is also an informative feature for all labeling schemes. Previous studies show that the PUSH flag corresponds to a HTTP object [18]—data collected and evaluated herein also yields a high correlation between the two. The maximum number of objects sent in a TCP connection quantifies the prevalence of HTTP pipelining or connection reuse—this is more popular for traditional (non-mobile) web pages and video pages as compared to their counterparts.

The median number of push packets sent by the client per TCP connection appears to be informative for the genre and navigation-based labels (FIG. 2 confirms this). Clients that view landing pages use PUSH flags slightly more often than non-landing or search pages. This is presumably because landing pages are likely to collect many more objects summarizing the web site; these objects are co-located on a small number of servers—this may be done to help reduce the load time for the "entry page" of the web site by using persistent connections and by contacting less number of servers. It is also observed that the distinguishable categories using this feature (i.e., genre and content) also tend to include more JavaScript™ objects than other pages.

Total number of bytes transferred: The number of bidirectional packets is a feature that roughly approximates the amount of data transferred to render a web page. As expected, this feature can be used to identify mobile and video pages. The minimum number of bytes transmitted by the client per TCP connection is informative for classifying mobile web pages—this makes sense because mobile sites are designed to be more efficient than traditional web pages.

Object size in largest TCP connection: The object size distribution for the largest TCP connection (i.e., the TCP with the most bytes transmitted) is a valuable feature for discerning video traffic and is not useful for any other labeling scheme. It is common for video objects to be larger than 200 KB, which is rare for other types of traffic.

Temporal Features: Features in Group 8-10 are temporal features. These are found informative mostly for the video labels. The three selected video features include, the 75 percentile inter-connection arrival time, the 75 percentile inter-object arrival time, and the average RTT. Two of these features, the inter-connection arrival time and inter-object arrival time, make sense for video classification because variable bit rate algorithms may request objects at irregular times to reduce transmitting video content that depends on a user's interest [21]. The average RTT is a notable feature— it perhaps reflects that video servers take longer to respond to requests than other servers.

Prior work on traffic classification (identifying the application layer protocol) has found port numbers and the sizes of the first few packets to be the most informative features [17]. This of web page classification, which also incorporates features that span multiple flows finds a completely different set of informative features—while port numbers are not even an applicable feature for web-only traffic, it was found that even the first few packet sizes does not help distinguish between different types of web downloads. This may be the case as the first few packets may capture handshaking mechanisms that are application protocol/application specific, but may not capture the differences between different types of web pages, which are transmitted over the same application.

IV. Web Page Classification

Evaluation Methodology: During evaluation, classification methods similar to the ones used widely for traffic classification [15] may be used for consistency. This includes the non-parametric methods—that do not make assumptions about the distribution of features—of K-Nearest Neighbors (KNN) and Classification Trees (CT), as well as the parametric methods of Naive Bayes (NB) and Linear Discriminant Analysis (LDA).

To ensure that the dataset used in this section is consistent with prior knowledge of browser usage in real-world traces, a random sample of 34,000 of the captured web page downloads by browser (using weights from Table II). This data was used to evaluate web page classification using the four independent labeling schemes: video streaming labels (VSL), target device-based (TDL), Alexa genre-based (AGL), web page navigation-based (WNL). Ten (10) independent 5-fold cross validation trials were then conducted (80% of the dataset is used for training and 20% is used for testing).

The classification accuracy is defined as the percent of web pages that are correctly classified. It was assumed that the accuracy, $X_i$, of each 5-fold cross validation run is independent and random (due to randomly selecting web pages that are used for training sets and test sets). The mean accuracy, $\overline{X}$, for the five (5) trials is computed as: $\overline{X} = \Sigma_{i=1}^{10} X_i/5$.

For comparison, results for a baseline heuristic called random guessing (RG) were also included. RG randomly assigns a label to a web page, thus, the expected performance of random guessing is 1/L, where L is the number of classes for a given labeling scheme. Another more challenging baseline heuristic called "apriori" guessing (AG) was also added, which relies on prior knowledge of the frequency of the most common class. Apriori guessing assigns a label to the class that is known to appear most often in the dataset. The classification accuracy of apriori guessing can be expressed as $\max_{(i \in [1,L])} \{F\_i\}$, where F_i is the fraction of times class i appears in a dataset (obtained from Table I). Outperforming the apriori guessing baseline heuristic means that the classification performance is not biased towards dominant classes in the dataset.

TABLE III

WEB PAGE CLASSIFICATION ACCURACY

| Stable Tcpdump features | Classification Model | | | |
|---|---|---|---|---|
| | VSL | TDL | AGL | WNL |
| KNN | 99% | 90% | 73% | 82% |
| CT | 99% | 86% | 61% | 76% |
| NB | 94% | 60% | 5% | 45% |
| LDA | 94% | 60% | 5% | 45% |
| RG | 50% | 50% | 5% | 33% |
| AG | 95% | 74% | 25% | 45% |
| Unstable Tcpdump features | 98.3% | 84.1% | 62.3% | 77.6% |
| Netflow features | 98.4% | 87.6% | 67.2% | 77.7% |
| Stable Tcpdump: different browsers | 98.4% | 84.4% | 58.1% | 72.5% |
| Stable Tcpdump: different time | 99.1% | 88.7% | 70.4% | 79.9% |

Classification Results: Table III above summarizes the mean classification accuracy of the learning methods for each labeling scheme. For the stable fine-grained tcpdump derived features, it was found that:

1—The classification accuracy of the non-parametric KNN and Classification Trees models are comparable (i.e., ±2-8% where KNN performs the best), and perform much better than the parametric Naive Bayes and LDA models. In fact, the Naive Bayes and LDA classifiers sometimes perform worse than apriori guessing (though all methods outperform random guessing in most cases). This result makes sense because the non-parametric methods do not rely on assumptions about the probability distribution that the features are drawn from and is consistent with the observations made in [17].

2—The related performance metrics of recall and precision, shown in Table IV below, similarly vary across labeling schemes for KNN method. The precision, p, and recall, r, are functions of the true positives (tp), false positives (fp), and false negatives (fn), where p is given by tp/(tp+fp), and r is given by tp/(tp+fn). For the video streaming and target device-based labels the precision and recall are approximately 80% or higher. The navigation-based labels yield a smaller recall and precision of mostly between 80-90%. The genre-based label has a recall and precision of between 70-80% for classes.

TABLE IV

PRECISION AND RECALL (KNN, STABLE TCPDUMP FEATURES)

| Labeling Scheme | Class Names | Precision | Recall |
|---|---|---|---|
| Video Streaming | Video | .98 | .98 |
| | Non-video | .99 | .99 |
| Targeted Device | Traditional | .89 | .89 |
| | Mobile optimized | .94 | .94 |
| Alexa Genres | Computers | .76 | .77 |
| | Business | .76 | .75 |
| | Shopping | .72 | .75 |
| | News | .77 | .75 |
| Web page Navigation | Clickable content | .90 | .85 |
| | Search result | .81 | .85 |
| | Landing | .68 | .70 |

Sensitivity Analysis: A study of whether the features selected in Section III actually outperform features that are less robust was performed. Specifically, classification accuracy is compared when the most unstable (over time) features are selected from each of the 10 feature groups in Section III, instead of the most stable ones. Recall that all features in each group are fairly informative (for classification) and are highly correlated with each other. The results are summarized in Table III, which shows that accuracy with unstable features can be up to 10% lower than with stable features. Thus, it is important to include not just informative features for classification (as most work on traffic classification does), but to also consider the stability of a feature.

Netflow-derived features were considered. The results above are obtained with classification performed based on fine-grained features derived from per-packet TCP/IP headers. Sometimes, access to such packet traces may be infeasible or costly. It is also uncertain as to what accuracy can be achieved if only coarse-grained features that are obtainable from Netflow logs are used for classification. For this, those (stable) features from each group that can be derived from Netflow logs were considered. For instance, instead of the maximum number of PUSH packets sent by the client (Group 2), the maximum number of bytes sent by the client per TCP connection was included. None of the features in Group 6 and 7 qualify.

Table III above illustrates that while video-streams can still be identified with high accuracy; netflow-derived features yield lower classification accuracy by up to 8% for the other classes. It should be noted that the performance with even coarse-grained netflow features is better than with unstable tcpdump features—this further underscores the importance of considering stability in selecting fine-grained features.

Sensitivity to time and browser were considered. The dataset includes six (6) repeated downloads of each web page, using five (5) different browsers for each. While features that are the most robust across time and browsers are identified, it is important to understand the impact of training on one portion of a dataset and testing on another. The impact of time on classification performance is considered, controlling for browser. Table III above illustrates that this hardly affects classification performance at all. This result is promising, because it implies that classifiers do not have to be trained on data every day. In fact, the dataset above includes measurements spaced out over a period of nearly 20 weeks!

The impact of browser on classification performance, controlling for time, was also considered. Table III above shows that while video streams can still be identified with the same accuracy, the accuracy for the mobile-targeted and navigation-labels reduces by about 6-10%. One significant impact, however, is on the genre-based labels, which can be classified only with 58% accuracy. This implies that traffic classification performance is much more browser-dependent than time-dependent—the analysis of repeatability and consistency of traffic features in Section III supports this observation. It may be concluded that it is important to train models on data that is representative of browser mixes found in real-world traces.

Whether the classification can be done with less packets was also considered. Some applications—such as rate-limiting or intrusion detection—benefit if a web page can be classified while it is being downloaded. Since most of the 10 selected features are multi-flow features, they may not be estimated accurately before a transfer has completed. In order to analyze how many packets need to be observed before web page classification can be performed accurately, an analysis of the first N (varied from 10 to 1000) TCP/IP packets in a traffic trace and derive the stable tcpdump features only from this limited information.

TABLE V

CLASSIFICATION ACCURACY (KNN) WITH FIRST N PACKETS

| Classification Model | VSL | TDL | AGL | WNL |
|---|---|---|---|---|
| 10 Packets | 75% | 75% | 35% | 50% |
| 100 Packets | 94% | 79% | 42% | 60% |
| 500 Packets | 97% | 83% | 63% | 67% |
| 1000 Packets | 99% | 88% | 65% | 72% |

Table V above illustrates that the classification performance is proportional to the number (N) of packets used. For the dataset, the average number of packets transmitted per web page is 2200. It was found that while there is a performance hit for using only 25-50% of the packets downloaded for classification; classification accuracy is still high for video traffic and mobile-optimized web pages, and reasonable for navigation-type.

A determination of how good the classification results were conducted. Traffic classification studies from recent literature boast of classification accuracies higher than even 94%. In comparing results obtained according to methods and systems herein to those, it is important to keep in perspective several fundamental differences:

1—The instant classification framework is subject to the web page design decisions of developers. Standards do not exist that ensure that web pages of a particular category yield similar traffic, which may be why non-parametric classification methods such as KNN and Classification Trees significantly outperform parametric methods. It was found that many web sites that host similar content tend to follow similar web page design trends. For example, mobile web sites tend to design their pages to be more resource conscious than traditional web sites. Moreover, modern search engines include similar search options such as web search, image search, and news search. Modern web sites also use web page templates and content management systems. Thus, many of the corresponding web pages follow a predefined structure that can be observed in traffic. The need of strategically sampling web sites that are likely to be included in a real data set are needed as is focusing on popular web sites. It is also beneficial to keep the training data set up to date, since web pages evolve over time.

2—The Alexa genre classification may be noisy. Web page designers have the freedom to arbitrarily assign labels to web pages that serve a particular purpose however, they please. Even when web pages do serve a particular purpose, its label may be unclear. For example, what type of website is the gaming review website www.ign.com—a news website, an entertainment website, or a game website? Should social networking sites be considered news sites? These factors increase the variance and noise in each of the class labels.

3—There is also legitimate reasoning to incorporate information (e.g., regarding how often a particular class appears "in the wild") into the classification models. Classification models used by systems and methods herein do not use such information because the dataset is synthetic—any prior information would give an inappropriate and non-representative increase in performance. A real-world dataset that was collected "in the wild", though, would be able to benefit from such information.

V. Applicability of the Classification Results

In Section I, several motivating examples were described as having applicability to web page classification using TCP/IP headers, and why the instant subject matter of classifying web pages using TCP/IP headers is advantageous (e.g., anonymity, less constraint on resources, improved traffic/resource modeling, or the like). In this section, two exemplary embodiments are focused on in an effort to quantify the impact of the instant subject matter.

Examining Whether Feature Distributions for Classified and Ground-truth Labels Match There is a need to study whether the classification model and results described herein are useful in extracting the true distributions of features within a given class—that is, for a given class, do the feature distributions observed across classified web pages match those observed across ground-truth labels? If they do, then the instant classification methodology can be used to derive ground-truth feature distributions from real-traces—which can then be used for traffic modeling and simulation studies. They can also be used to monitor and understand the general usage profile of a population.

For studying this issue, the distributions of features obtained from traffic with ground-truth labels was compared to those resulting from traffic with classified labels. In one test, the Wilcoxon sum ranked test, tests the hypothesis that the medians of the two distributions in question are the same. The Wilcoxon sum ranked test was used because it does not rely on strong distribution assumptions such as normality. The second hypothesis test method, the Kolmogorov-Smirnov test, tests whether the two empirical distributions are the same. For each of these hypothesis tests, larger p-values are better.

Table VII below summarizes the p-values for two traffic features, including the number of TCP connections and the number of bytes transmitted while downloading a web page, when the traffic is classified using either KNN or LDA. The following was found:

1—With the KNN classifier, the Ranked sum and Kolmogorov-Smirnov tests yield p-values that indicate that both the median as well as the empirical distributions of these two features are the same across classes identified using either classified labels or ground truth labels. More importantly, the tests for the results for KNN are favorable with p-values that tend to be larger than 0.05 for all classes for each feature shown—this is true even for the AGL labeling scheme (results shown only for the 4 most common genres).

2—This result is not true for all classification methods. In fact, LDA consistently yield results that favor the alternative hypothesis that the distributions of the classified traffic differ from the ground truth with p-values that are consistently much lower than $10^{-10}$.

Other features that are relevant for traffic generation and simulation modeling were analyzed and have arrived at the same statistical conclusions. This result is not surprising since traffic can be identified based on the most informative features.

Figure 3A:
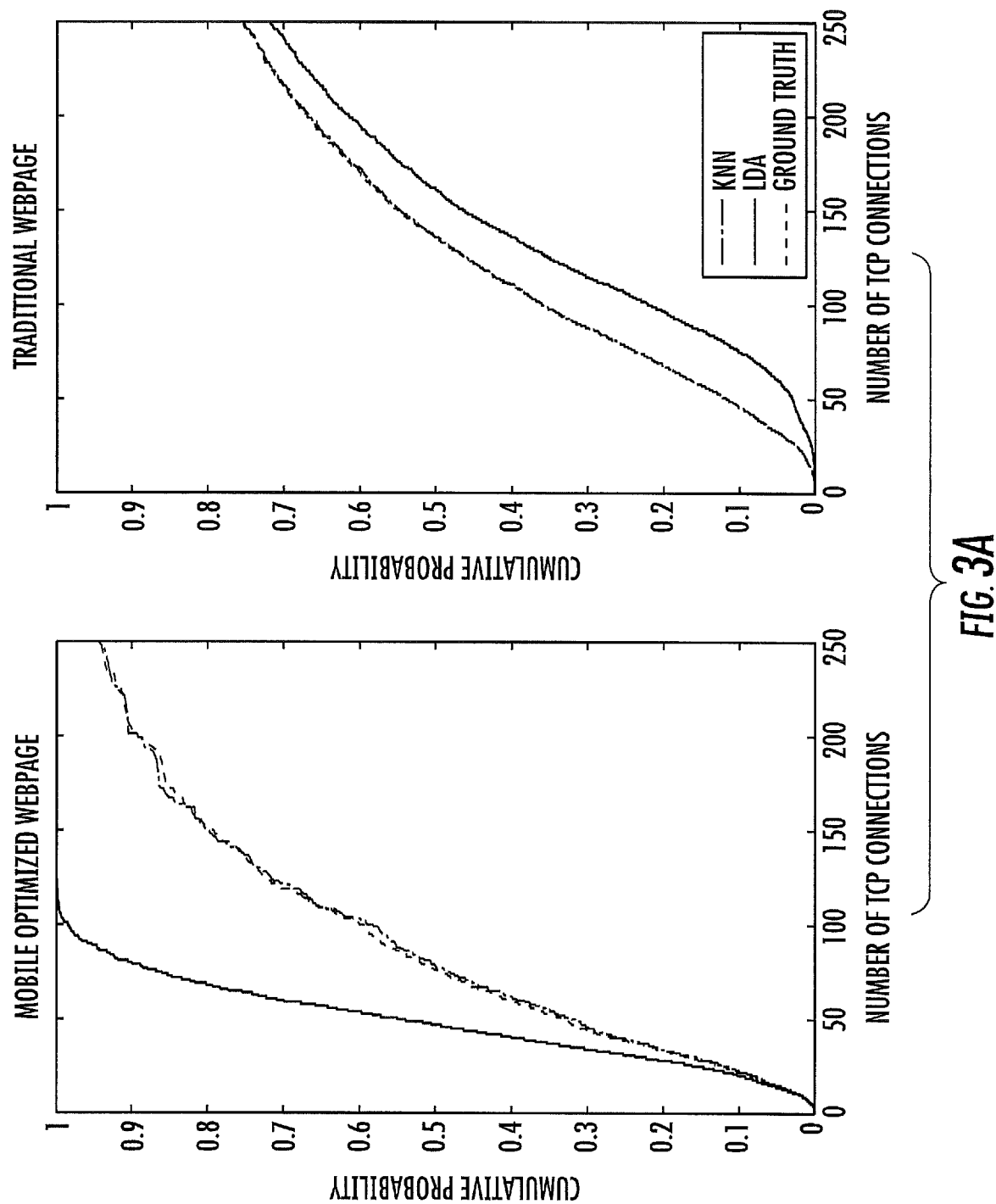
FIGS. 3A to 3C are graphical illustrations of the accuracy associated with predicting web page classifications using an exemplary web page classification model according to the disclosure herein.

FIG. 3A is a graphical illustration of cumulative distributions for the number of TCP Connections feature corresponding to the targeted device-based labels as yielded using the KNN and LDA classification methods. That is, the KNN curve and the ground truth curve substantially overlap, thus, it can be determined that the classification model accurately predicts ground truth traffic. LDA essentially classifies the data that maximizes the separation between the two classes—this behavior is similar to that of a clustering method [7]. Hence, the shift of the number of servers for web pages for each respective class (i.e., a left shift for mobile web pages and a right shift for traditional web pages). Such exaggeration yields unrealistic distributions in the labeled classes by not accounting for the diversity of each web page class.

Figure 3B:
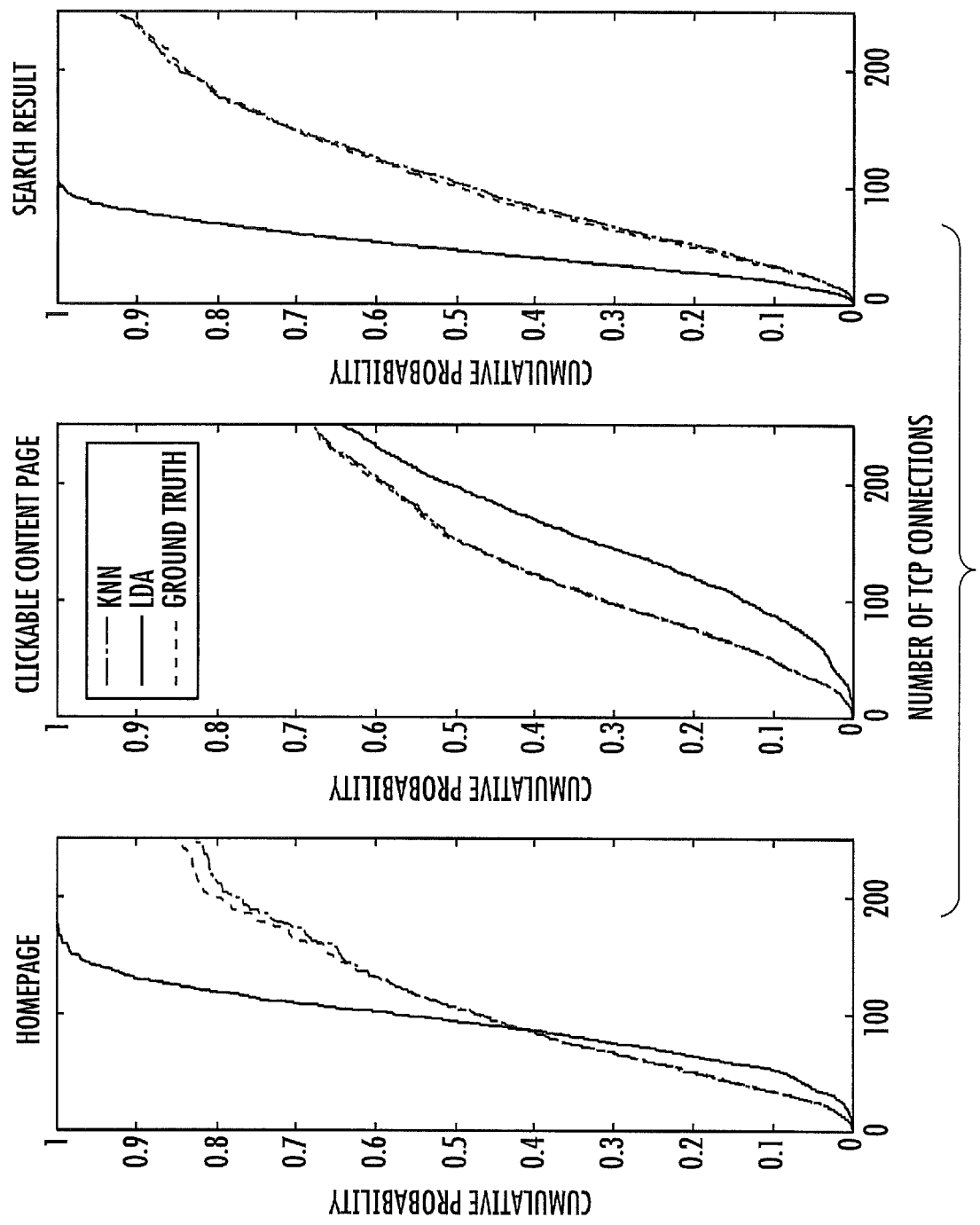
Figure 3C:
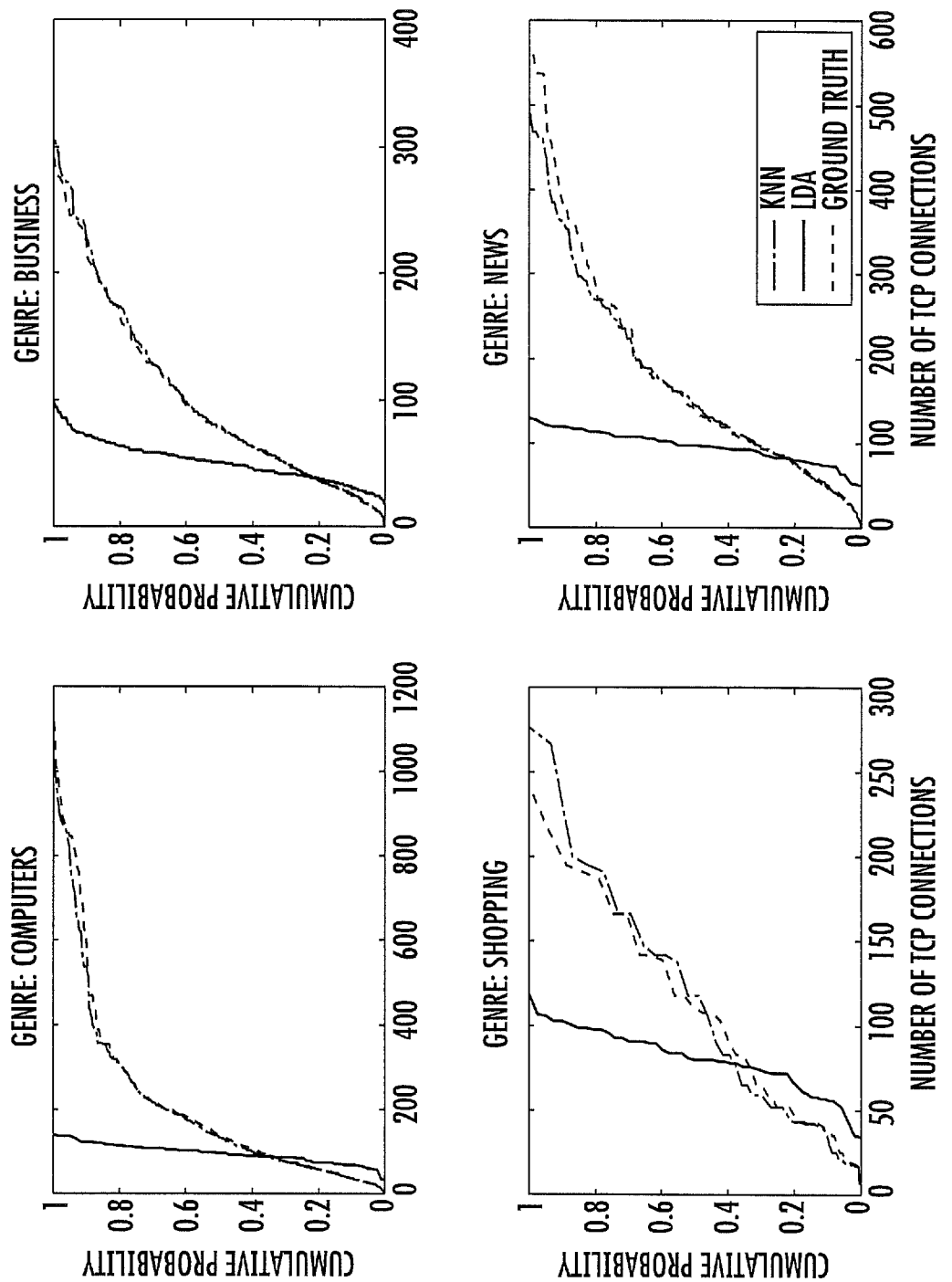

It can be concluded that classification methods that perform well, such as KNN, can be used to extract true distributions of traffic features within classes (matching the trained distribution), while parametric methods, such as LDA, despite performing better than a random guessing baseline, cannot. Such results are displayed in FIGS. 3A to 3B.

One Possible Application: Building Traffic Models for Forecasting

Forecasting traffic growth can help with better capacity planning. Specifically, two emerging trends are discussed—growth in mobile web usage, as well as growth in video streaming. One aim is to study whether traffic predictions based on these two trends look any different when they rely on classified labels instead of ground-truth labels.

Traffic Generation Methodology: The traffic generated by relying on ground-truth versus classified labels is compared. For the comparison, the ns-2 network simulator is used to simulate the behavior of 400 active web users—all to/from traffic is aggregated on a 1 Gbps link. Each user behaves independently and randomly visits a web page. The inter-arrival time for web page downloads by a given user is Gaussian distributed with a mean of 30 s and standard deviation of 15 s—this distribution is chosen for simplicity (and is adequate for the purpose of comparing the impact of classified and ground-truth labels).

The download of each web page itself is simulated using TMIX, which provides a source-level traffic generation interface in ns-2 [29]. Specifically, this tool with the TCP/IP trace of a web page download (selected randomly from the 100,350 downloads collected in Section II). TMIX then derives from the trace, application-level descriptors of the corresponding traffic sources—including request sizes, response sizes, user think times, and server processing times. It then generates a corresponding traffic in ns-2 by reproducing these source-level events. Thus, this tool allows production of realistic source-level behavior for each web page download. This traffic generation methodology is discussed in the context of two forecasting applications below.

Figure 4A:
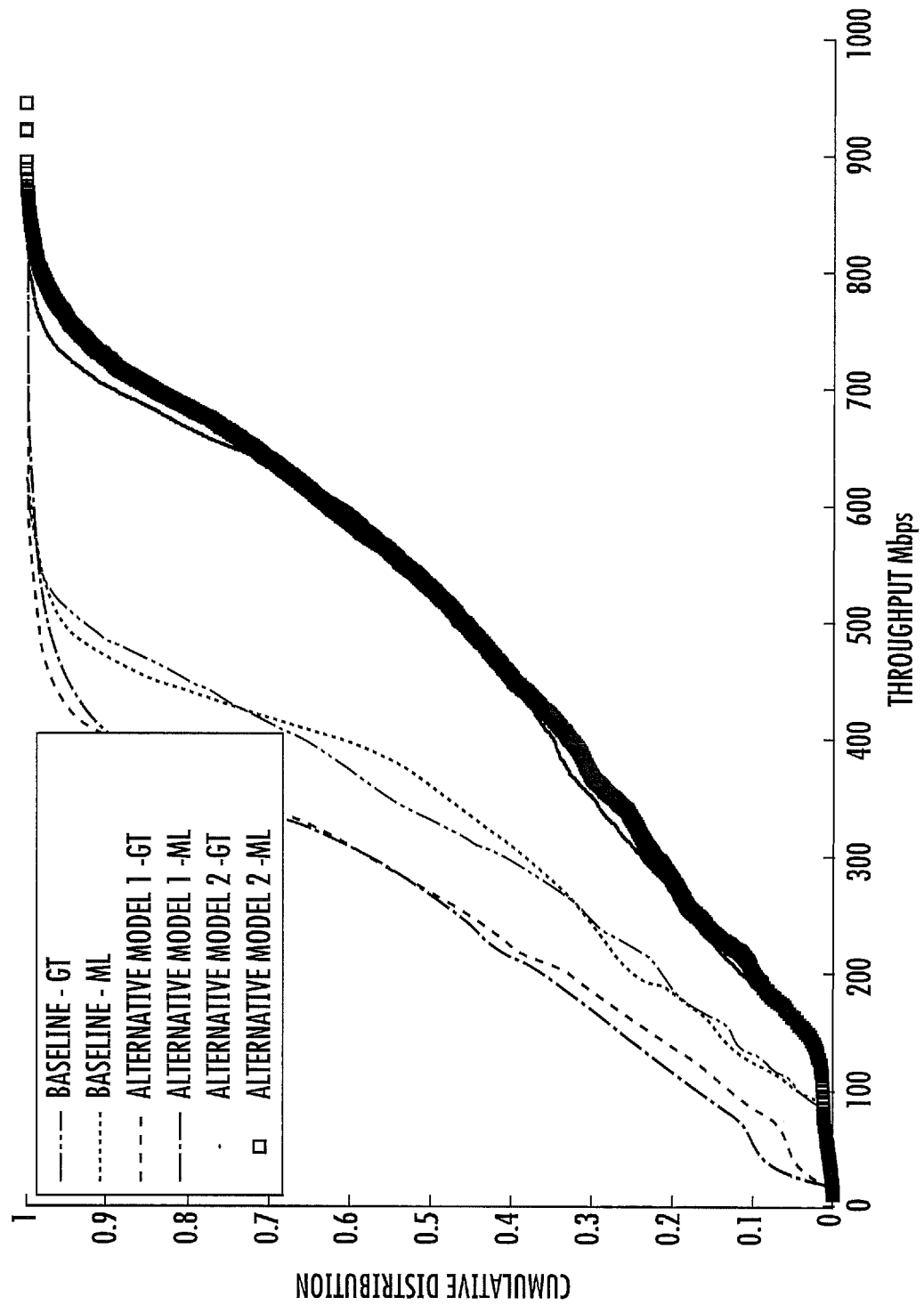
FIGS. 4A and 4B are graphical illustrations of the accuracy associated with forecasting traffic using an exemplary web page classification model according to the disclosure herein.

Modeling Growth in Mobile Web Usage: A baseline model is constructed, in which each user visits a mobile-optimized web page 20% of the time and a traditional page 80% of the time—nearly 20% of current web traffic is considered mobile [40]. The TMIX input for each is obtained by randomly selecting a mobile (or traditional) page download from the set of 100,350 downloads—two experiments were conducted, in which the mobile or traditional pages are selected based on either ground-truth (GT) labels or KNN model labels (ML). The throughput on the 1 Gbps aggregated link is observed every 1 ms, and its distribution is plotted in FIG. 4A.

Two sets of experiments that incorporate growth in mobile traffic were conducted. In the first set, referred to as alternate model 1, a scenario in which all users start abandoning their desktop and laptops is envisioned, in favor of mobile devices—specifically, in this model, each user visits a mobile-optimized web page 50% of the time (labelled using either GT or ML). In the second set of experiments, growth in the number of users that rely solely on mobile devices is envisioned. In this model, referred to as alternate model 2, the behavior of the 400 baseline users is retained, but simulated an additional 200 users that browses only (GT or ML-identified) mobile-optimized web pages (100% of the time). The distribution of the aggregate throughput for each of these forecasting experiments is also plotted in FIG. 4A. From FIG. 4A, it is determined that 1—First, the distributions yielded by the ground-truth (GT) and the classified labels (e.g., ML) are quite similar to each other. In fact, the hypothesis testing approaches mentioned earlier were run to confirm that the distributions are, in fact, statistically equivalent. This is true for the baseline traffic, as well as each of the forecasted alternative models. This confirms that web page classification, based only on anonymized TCP/IP headers, can be used to effectively conduct traffic modeling studies involving mobile web traffic.

2—The distributions suggest that an enterprise that expects an increase in next-generation users that spend most of their time on mobile devices (alternate model 2), is likely to face capacity issues earlier than one in which most users simply choose to spend more time on mobile devices (alternate model 1).

The subject matter herein is not to make forecasting claims about mobile data (which needs more sophisticated traffic models), but simply to illustrate that this classification can be used for facilitating such traffic modeling applications.

Figure 4B:
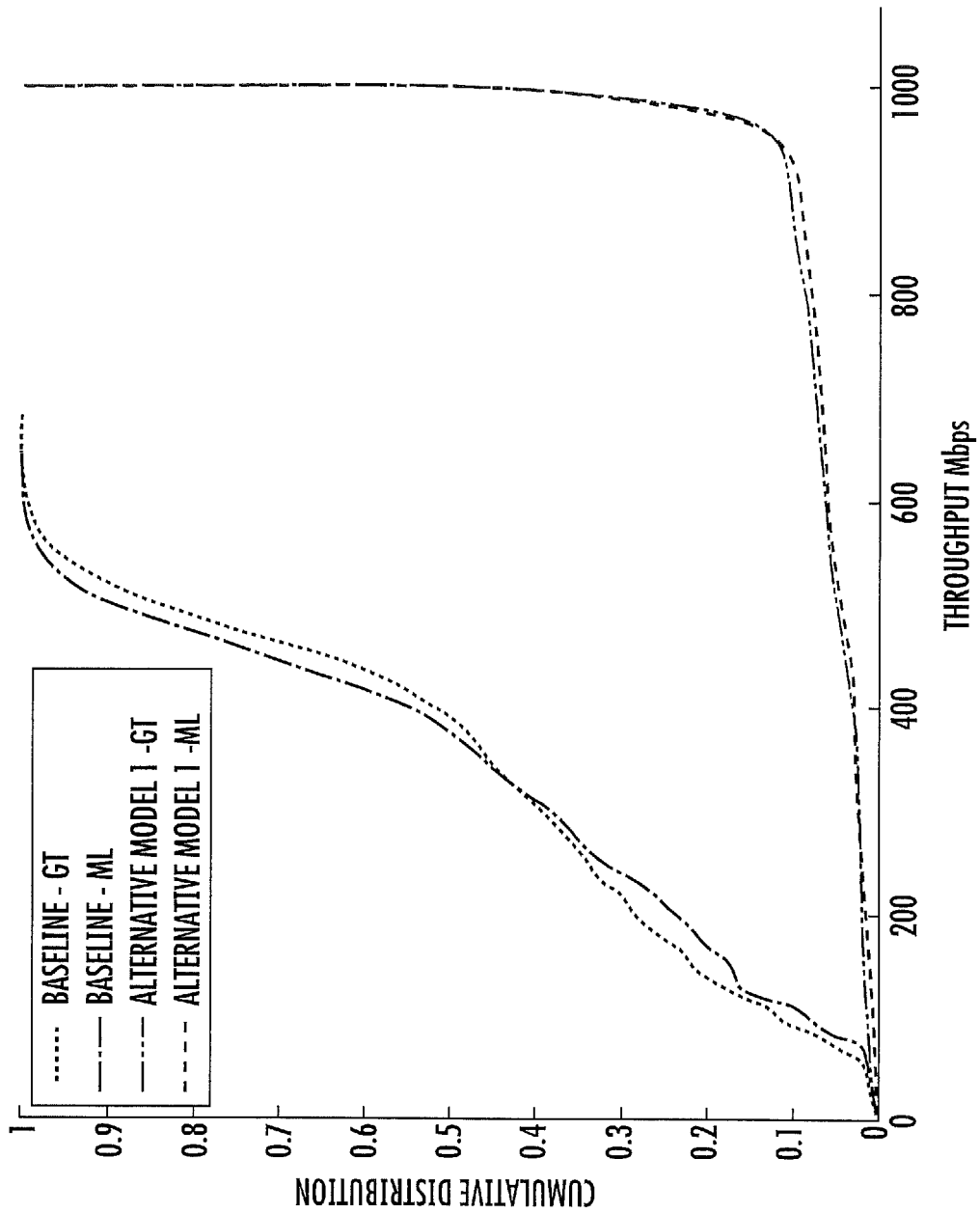

Modeling Growth in Video Streaming: The same approach as above is used to construct a baseline model, in which a user downloads pages with video traffic 20% of the time, and an alternate model 1, in which users access video-based web pages 50% of the time. The aggregate throughput is plotted in FIG. 4B. As FIG. 4B illustrates, the distributions obtained by relying on classified labels (e.g., ML) are nearly identical to (e.g., and overlap) the ones derived using ground-truth (GT) labels. This is true even when the forecasted traffic drives the network to nearly full-utilization (alternate model 1).

Another Possible Application: Building User Browsing Profiles

Applications such as behavioral-ad targeting and clickbot detection rely heavily on building user browsing profiles [18, 14].

The ability to classify web page downloads according to respective content-genres can be used to profile users according to their interests, and target relevant ads towards them, without deep packet inspection.

A similar approach, that classifies based on navigation-type, can be helpful in detecting malware as well as in determining their intent in security applications, such as webpage scraping or search engine abuse [14]. In this section, synthetic browsing "sessions" are generated to evaluate the efficacy of work in recovering browsing profiles.

Generating Synthetic User Browsing Sessions: A user typically views several web pages in any given browsing "session". Alexa [34] includes statistics on the frequency of visiting a particular web site after being on a given (different) web site. This data is used to develop a simple markovian model of user browsing sessions as follows [4]. Each of the 3345 web pages in the data set is represented by a state, $S_i$. The transition probability between state $S_i$ and $S_j$ is assigned based on the transition frequency from Alexa for the corresponding web sites. This simple model is used to generate 1000 browsing sessions, of N clicks each—the starting state for each user session is selected randomly from the 3345 states. It should be noted that users who start browsing a particular genre (shopping, for instance), are likely to keep browsing in that genre, and the Alexa statistics used here will reflect that.

Figure 5:
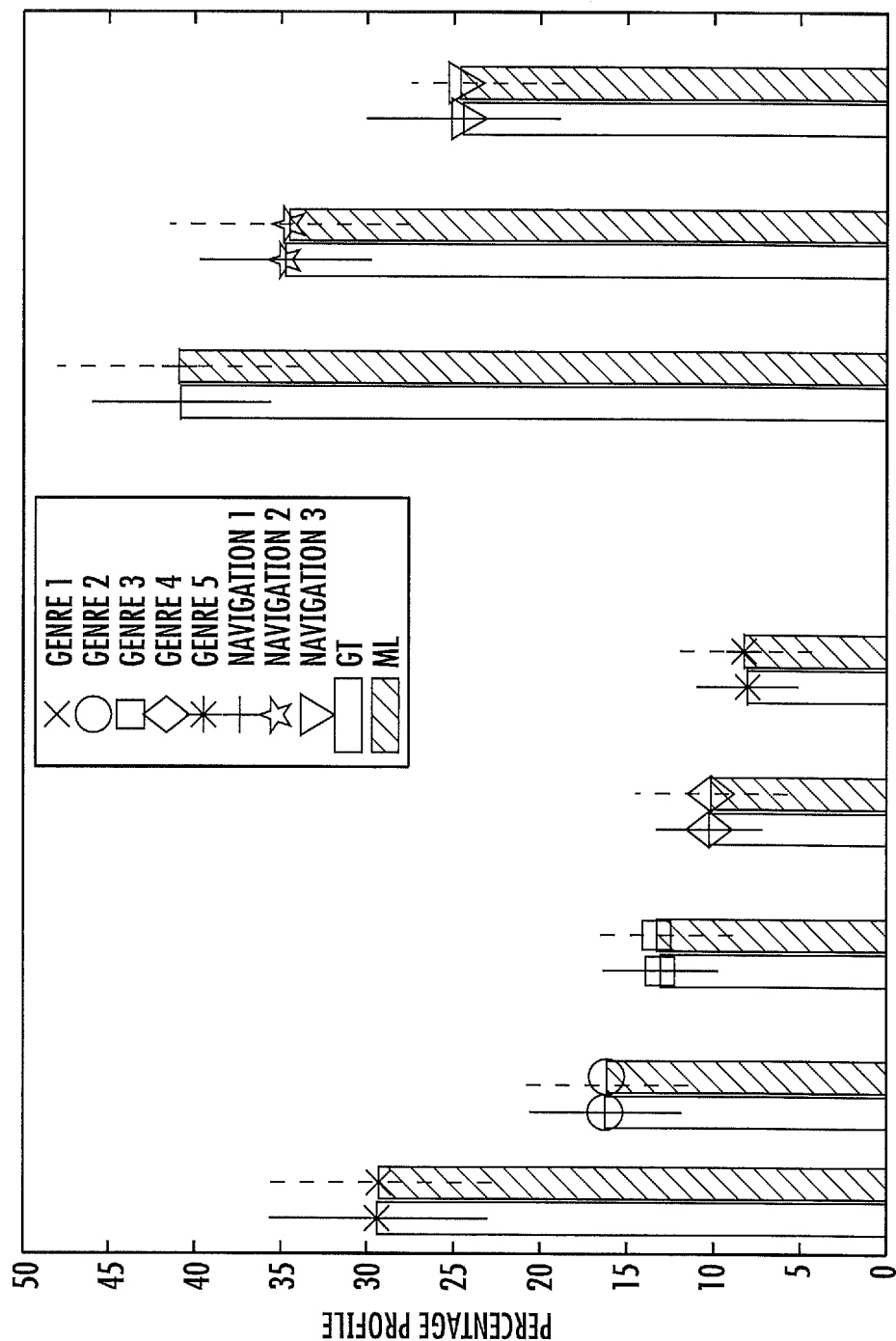
FIG. 5 is a graphical illustration of the accuracy associated with profiling user browsing and navigation genres using an exemplary web page classification model according to the disclosure herein.

Evaluation of User Browsing Profiles: The classification model is applied to label each webpage in each browsing stream. Profiles of each user can be shown according to the top five (5) genres of webpages visited in the stream. This approach allows for general and useful understanding of the types of webpages that a user has visited. FIG. 5 shows the 95% confidence interval of the difference between ground truth frequency profiles, and KNN labeled frequency profiles. Results show that the profiles using browsing streams using statistics from Alexa or randomly can be effectively approximated within ±4% for the top categories for the content and genre labeling schemes. However, this Figure does not provide any metric of whether the profile uses the correct labels.

In Table VI below, a list of percent of users for which the set of top-K genres based on classified-labels matches perfectly with that based on ground-truth labels. Even the top-5 genres that a user is interested in can be estimated perfectly for more than 80% of the users. Further, the length (N) of the browsing sessions has little impact on the estimation accuracy. These numbers are highly encouraging and suggest that targeted ad delivery can significantly benefit from web page classification based on just anonymized TCP/IP headers. It is important to note that even though the classification accuracy, precision and recalls for the AGL class were only around 75% in Section IV, the user browsing profiles being constructed here are simply relying on a comparison of the sets of top-K genres (and not correct classification of each of the N web-page visited). Table VI is provided below.

TABLE VI

PERFORMANCE OF USAGE PROFILING (I.E., CORRECT LABELS) ACCORDING TO CLICKSTREAM LENGTHS AND PROFILE DEFINITIONS.

| Labeling scheme | N = 20 | N = 50 | N = 200 |
| --- | --- | --- | --- |
| Genre-based label | | | |
| K = 1 | 86.0% | 85.2% | 89.2% |
| K = 2 | 89.2% | 89.2% | 89.2% |
| K = 3 | 83.2% | 86.8% | 86.8% |
| K = 4 | 84.8% | 81.2% | 81.6% |
| K = 5 | 80.4% | 82.0% | 92.0% |
| Navigation-based label | | | |
| K = 1 | 94.8% | 94.0% | 91.2% |
| K = 2 | 98.8% | 96.0% | 99.2% |

Another piece of useful information that may be needed from a user browsing profile is that fraction of time a user chooses to visit a particular genre. For instance, if a user visits the top genre 95% of the time, he/she is unlikely to be interested in ads related to any of the other top genres. Statistics may be collected on the fraction of time a user visits each of the respective top-5 genres (both based on ground-truth labels as well as classified labels). FIG. 5 plots the median and 95% confidence intervals of these per-user fractions, for their top-5 genres. The top-genre browsing frequencies yielded by classified labels align extremely well with those based on ground-truth labels. It can be concluded that web page classification is fairly well suited for building frequency-based user browsing profiles, even for content-genre based labels. Of note, identifying individual users via traffic analysis may be difficult due to network proxies and other technology. However, previous work shows that other methods for identifying malicious users behind proxies are still effective despite this limitation [14].

Table VI above also includes results for building user browsing profiles based on navigation-type classes. As seen in Table VI, the corresponding profiles can be built using classified labels with even higher accuracy.

Figure 7:
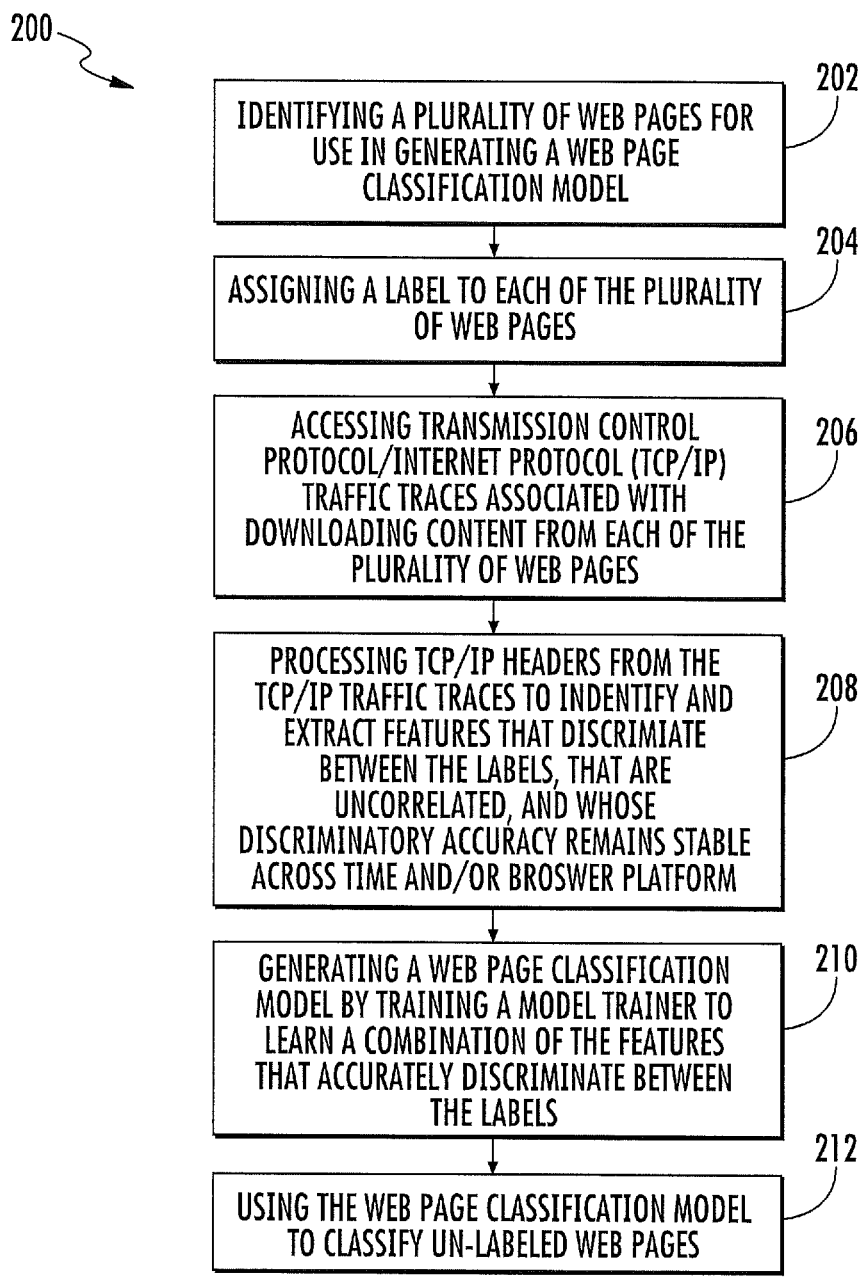
FIG. 7 is a block diagram illustrating an exemplary method for generating and using a web page classification model according to the disclosure herein.

FIGS. 6 and 7 illustrate exemplary systems and methods in which a web page classification model is generated and used according to the subject matter describe herein.

FIG. 6 is a block diagram illustrating an exemplary system or computing platform 100 (e.g., a single node or multiple processing core computing device or computing platform) configured to generate and output a usable web page classification model for use in a wide variety of web page classification applications, not limited to targeted advertising applications, network forecasting applications, profiling applications, security applications, etc., or the like. Computing platform 100 may include any suitable entity, such as a computing device for performing one more aspects of the present subject matter described herein or in the technical paper by S. Sanders and J. Kaur, entitled, "Can Web Pages Be Classified Using Anonymized TCP/IP Headers?", in Proceedings of IEEE INFOCOM, Hong Kong, April 2015, the disclosure of which is incorporated herein by reference in its entirety as if set forth fully herein.

In accordance with embodiments of the subject matter described herein, components, modules, and/or portions of computing platform 100 may be implemented or distributed across one or more (e.g., multiple) devices or computing platforms. For example, a cluster of platforms 100 may be used to perform various portions or steps associated with generating and/or using a web page classification model.

It should be noted that platform 100 and its components and functionality described herein constitute a special purpose test node or special purpose computing platform that improves the technological field of web page classification and/or web page classification prediction by allowing prediction of a web page class or label via statistical distributions occurring within discriminatory features using information derived from only from anonymized TCP/IP header information, and without the need to examine a packet payload.

In some embodiments, platform 100 includes a node having at least one processor 102. In some embodiments, processor 102 includes a hardware processor, a multi-core processor, or any suitable other processing core, including processors for virtual machines, adapted to execute instructions stored by an access memory 104. In some embodiments, platform 100 may be spread across several devices having a respective several processors 102 and/or memories 104.

Memory 104 may include any non-transitory computer readable medium and may be operative to communicate with one or more of processors 102. Memory 104 may include a Web Page Classification Model Generator (WPCMG) 106 and a Model Testing and Validation Module (MTVM) 108 configured to collectively generate, train, and validate web page a classification model for use in various application (e.g., forecasting applications, profiling applications, security applications, advertising applications, etc.).

In accordance with embodiments of the subject matter described herein, WPCMG 106 may include a module configured to access and/or receive TCP/IP traces or flows generated from TCP/IP packet data traffic when content from a web page is downloaded, the TCP/IP traces or "flows" can have respective anonymized TCP/IP headers so that at least the client is anonymized. WPCMG 106 is configured to derive and extract predetermined or dynamically determined features from the TCP/IP flows, and classify a web page (e.g., by content type, navigation, video streaming, targeted device, etc., see e.g., Table I) using features obtained from only the anonymized TCP/IP headers. Features used to discriminate between web page labels include those that are uncorrelated and whose discriminatory accuracy remains stable across time and/or browser platform.

In some embodiments, WPCMG 106 includes a labeler 110, a feature extractor (FE) 112, and a model trainer 114 or classifier. Labeler 110 is configured to apply a label or class from a labeling scheme (see e.g., Table I) to a plurality of pre-selected web pages, (the top 250 web pages) for use in generating a web page classification model. Labels and/or labeling schemes may be generic (e.g., generic to content, navigation page, etc., see Table I) and may optionally be stored and accessed from a remote or local database of labels 110A. Database of labels 110A may include a look up table or cache containing labels, provisioned labels, and/or or the labels may be accessed by labeler 110 using any other suitable technique, such as labels that are coded to memory 104. Any labeling scheme and/or label storage device may be accessed, applied, and used.

WPCMG 106 further comprises a feature extractor (FE) 112 configured to process TCP/IP headers from the TCP/IP traffic traces used in downloading content from the web pages and identify and extract features that discriminate between the labels. Such features are uncorrelated and stable across time and/or browser platform. Features may be predetermined or dynamically determined by WPCMG 106 according to Section III entitled "FEATURE SELECTION" above.

WPCMG 106 further comprises a model trainer 114 configured generate a web page classification model upon being trained to recognize characteristic distributions within the features associated with each labeling scheme and/or labels. For example, model trainer 114 is configured to learn which combination of the features accurately discriminates between labels of a labeling scheme. Model trainer 114 may access training data, optionally stored within a training data database 114A. In some aspects, training data includes data collected from strategically sampled web pages that are likely to be included in a real data set, such as focusing on popular web pages. The training data set should be kept up to date, as web pages may evolve over time.

After model trainer 114 is trained and a model is generated therefrom using the training data, the model may be tested and validated via MTVM 108. MTVM 108 may optimally test the model generated at model trainer 114 using actual observed web page classification data, accessed from an observed data database 108A. If the model is valid and accurate within a given percent, computing platform 100 is configured to output a trained and validated web page classification model for use in predicting a class (e.g., genre, type, video/non-video, access device, navigation type, etc.) associated with one or more web pages downloaded by an anonymized client for use in various applications, in some aspects, that is classified on the basis of analyzing only anonymized TCP/IP headers.

It will be appreciated that FIG. 6 is for illustrative purposes and that various components (e.g., modules or the like), their locations, and/or their functions may be changed, altered, added, combined, separated, or removed. For example, components and/or functions may be combined into a single entity. In a second example, a node and/or function may be located at or implemented by two or more nodes.

FIG. 7 is a block diagram illustrating an exemplary method, generally designated 200, of generating and using a web page classification model, in some aspects, to predict traffic for use in various different applications. At block 202, a plurality of web pages for use in generating a web page classification model is identified. The web pages may be strategically selected, and in some aspects, include the top 50, the top 100, or the top 250 web pages, ranked by popularity, number of clicks, or other factor.

At block 204, each of the plurality of web pages is assigned a label. The label may include a component of a labeling scheme and may be generic, and include a generic label and/or generic classes within that label. Exemplary embodiments of labels within a labeling scheme are depicted in Table I above.

At block 206, TCP/IP traffic traces or flows associated with downloading content from each of the web pages are accessed using the TCP/IP headers from the TCP/IP traces. At block 208, the TCP/IP headers are processed to identify and extract features that discriminate between the labels. Such features are uncorrelated and have a discriminatory accuracy that remains stabled across time and/or browser platform. An exemplary process of selecting, extracting, and/or identifying features is described in Section III above.

At block 210, a web page classification model is generated by training a model trainer to learn a combination of the features that accurately discriminates between the labels. Thus, a classification model is learned and/or trained.

At block 212, the web page classification model is used to classify unlabeled web pages for use in various applications, not limited to profiling applications, forecasting applications, security applications, and/or targeted advertising applications.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

The subject matter herein advances the state of the art in traffic classification both methodologically as well as by offering new insights. Methodologically, the subject matter herein (i) establishes the need for (and present metrics for) finding consistent (across browsers) and stable (over time) informative features, (ii) using features that span multiple TCP/IP flows, (iii) using a statistical framework to study the applicability of classification results in the context of real-world applications. This analysis leads to new insights on which multi-flow TCP/IP features are robust and informative for web page classification, as well as what type of web page classes can be successfully identified using these.

VI. List of Informative TCP/IP Features

Group 1: Number of IP Pairs—video, mobile, genre, content Number of Push flags sent by the client, video, mobile, genre, content Number of Bidirectional Push flags, video, mobile, genre, content Number of Bidirectional Reset flags, video, mobile, genre, content Number of TCP connections, video, mobile, genre, content Number of Objects, video, mobile, content, genre Group 2: Maximum number of push flags per TCP connection sent by the client—genre, mobile, content, video 90 percentile number of objects per TCP connection—mobile, genre, content 90 percentile number of push flags per TCP connection sent by the client—genre, mobile, content Maximum number of push flags per TCP connection sent by the server—genre, content, mobile Maximum number of objects per TCP connection—genre, mobile, video, content 75 percentile number of bytes per TCP connection sent by the client—mobile, content, genre 90 percentile bytes per TCP connection sent by the client—genre, mobile, content Maximum number of bytes per TCP connection sent by the client—mobile, content, video Maximum number of bytes per TCP connection sent by the server—mobile, content, video 90 percentile number of push flags per TCP connection sent by the server-genre, content, mobile 90 percentile Number of Bytes sent by client per epoch (Largest Connection bytes)—content, mobile, video, genre 90 percentile bytes per TCP Connection server—genre, mobile, content, video 90 percentile Number of epochs per TCP connection—mobile, genre, content Max percentile Number of Bytes sent by client per epoch (Largest connection epochs)—video, mobile, content, genre Max percentile Number of Bytes sent by client per epoch largest bytes—mobile, video Max percentile Number of Bytes sent by server per epoch largest bytes—video, mobile 75 percentile push per TCP Connection client—genre, content, mobile 75 percentile push per TCP Connection server—content, mobile, genre Group 3: Minimum number of bytes per TCP connection sent by the client—mobile Minimum number of bytes per TCP connection sent by the server—mobile Group 4: 50 percentile push per TCP Connection client—genre, content Average Number of push packets per TCP connection Client Sends—genre, content 50 percentile bytes per TCP Connection client—mobile, content, genre Average Number of push packets per TCP connection Server Sends—genre Average Number of bytes per TCP connection Client Sends—genre 50 percentile push per TCP Connection server—content, genre 50 percentile Number of epochs per TCP connection—genre, content Average Number of bytes per TCP connection Server Sends—genre, mobile, content 50 percentile bytes per TCP Connection server—genre, content Group 5: Bidirectional Packets—video, mobile Bidirectional Bytes—video, mobile Server Sends Bytes—video, mobile Server Sends Packets—video, mobile Group 6: 50 percentile Number of Bytes sent by server per epoch largest bytes—video 25 percentile Number of Bytes sent by client per epoch largest bytes—video 10 percentile Number of Bytes sent by server per epoch largest count—video 25 percentile Number of Bytes sent by server per epoch largest count—video 10 percentile Number of Bytes sent by client per epoch—video 25 percentile Number of Bytes sent by client per epoch—video Group 7: 90 percentile Number of Bytes sent by client per epoch largest count—video, mobile Average Number of Bytes sent by client per epoch largest count—video, genre, mobile Average Number of Bytes sent by server per epoch largest bytes—video, genre, mobile Number of meaningful epochs client—content video, mobile, genre Number of meaningful epochs client largest bytes—content, video, mobile, genre Sum Number of Bytes sent by client epoch largest bytes—content, mobile, video, genre 75 percentile Number of Bytes sent by server per epoch—genre, content, mobile 90 percentile Number of Bytes sent by client per epoch—mobile, content, genre Group 8: 75 percentile inter-connection arrival time—video, content 90 percentile inter-connection arrival time—content, genre, video Maximum inter-connection arrival time—genre Group 9: 75 percentile inter-object arrival time—genre, content Maximum inter-object arrival time—video, content 90 percentile inter-object arrival time—video, content 50 percentile inter-arrival epoch—genre, content Group 10: Average RTT—video 50 percentile RTT—video 75 percentile RTT—video

TABLE VII

COMPARING FEATURE DISTRIBUTIONS FROM CLASSIFIED WEB PAGES AND GROUND TRUTH LABELS

| Feature - | Statistical Test - | Label - | p-value (KNN/LDA) |
|---|---|---|---|
| Number of TCP Connections | Ranked Sum | Mobile Webpage | $.6066/.0230$ |
| | Kolmogorov-Smirnov | Mobile Webpage | $.9995/9.063^{-16}$ |
| | Ranked Sum | Traditional Webpage | $.9998/1.66^{-136}$ |
| | Kolmogorov-Smirnov | Traditional Webpage | $1.000/1.2551^{-129}$ |
| Number of TCP Connections | Ranked Sum | Video Webpage | $.8764/1.13^{-8}$ |
| | Kolmogorov-Smirnov | Video Webpage | $1.00/8.1467^{-12}$ |
| | Ranked Sum | Non-video Webpage | $.9583/.4879$ |
| | Kolmogorov-Smirnov | Non-video Webpage | $1.000/.2954$ |
| Number of TCP Connections | Ranked Sum | Computers | $.6405/3.26^{-6}$ |
| | Kolmogorov-Smirnov | Computers | $.9990/2.74^{-21}$ |
| | Ranked Sum | Business | $.8193/7.9043^{-11}$ |
| | Kolmogorov-Smirnov | Business | $1.000/1.9976^{-10}$ |
| | Ranked Sum | Shopping | $.6660/.0019$ |
| | Kolmogorov-Smirnov | Shopping | $.9310/1.3515^{-7}$ |
| | Ranked Sum | News | $.7675/0.0115$ |
| | Kolmogorov-Smirnov | News | $1.00/2.7189^{-6}$ |
| Number of TCP Connections | Ranked Sum | Homepage | $.3018/3.2032^{-74}$ |
| | Kolmogorov-Smirnov | Homepage | $.7833/8.5156^{-65}$ |
| | Ranked Sum | Search | $.9262/2.88^{-106}$ |
| | Kolmogorov-Smirnov | Search | $1.000/1.385^{-80}$ |
| | Ranked Sum | Clickable Content | $.5667/6.9477^{-31}$ |
| | Kolmogorov-Smirnov | Clickable Content | $.9878/2.64^{-45}$ |
| Number of Bytes | Ranked Sum | Mobile Webpage | $.3133/1.449^{-4}$ |
| | Kolmogorov-Smirnov | Mobile Webpage | $.8240/4.7474^{-5}$ |
| | Ranked Sum | Traditional Webpage | $.8597/6.413^{-84}$ |
| | Kolmogorov-Smirnov | Traditional Webpage | $1.00/4.1348^{-61}$ |
| Number of Bytes | Ranked Sum | Video Webpage | $.9173/.4364$ |
| | Kolmogorov-Smirnov | Video Webpage | $1.00/4.2076^{-4}$ |
| | Ranked Sum | Non-video Webpage | $.9924/.3151$ |
| | Kolmogorov-Smirnov | Non-video Webpage | $1.00/.2227$ |
| Number of Bytes | Ranked Sum | Computers | $.7127/6.0806^{-13}$ |
| | Kolmogorov-Smirnov | Computers | $.9998/2.5545^{-16}$ |
| | Ranked Sum | Business | $.9440/6.2451^{-10}$ |
| | Kolmogorov-Smirnov | Business | $1.00/6.009^{-11}$ |
| | Ranked Sum | Shopping | $.2248/.0045$ |
| | Kolmogorov-Smirnov | Shopping | $.7673/3.6009^{-7}$ |
| | Ranked Sum | News | $.9108/3.1335^{-5}$ |
| | Kolmogorov-Smirnov | News | $.9870/7.1233^{-5}$ |

TABLE VII-continued

COMPARING FEATURE DISTRIBUTIONS FROM CLASSIFIED WEB PAGES AND GROUND TRUTH LABELS

| Feature - | Statistical Test - | Label - | p-value (KNN/LDA) |
|---|---|---|---|
| Number of Bytes | Ranked Sum | Homepage | $.1847/4.9872^{-33}$ |
| | Kolmogorov-Smirnov | Homepage | $.7702/1.1971^{-29}$ |
| | Ranked Sum | Search | $.6982/6.0573^{-99}$ |
| | Kolmogorov-Smirnov | Search | $.9984/7.9544^{-99}$ |
| | Ranked Sum | Clickable Content | $.2476/0.0765$ |
| | Kolmogorov-Smirnov | Clickable Content | $.7670/1.6617^{-10}$ |

Table VII above is a summary of the p-values for two traffic features, including the number of TCP connections and the number of bytes transmitted while downloading a web page, when the traffic is classified using either KNN or LDA. Methods that perform well, such as KNN, can be used to extract true distributions of traffic features within classes (matching the trained distribution), while parametric methods, such as LDA, despite performing better than a random guessing baseline, cannot. A web page classification model can learn the combination of the features that accurately discriminates between the labels, that includes uncorrelated features, and that remains stable across time and/or browser platform for model generation.

It should be noted that a computing platform (e.g., FIG. 6), its components and its functionality described herein constitute a special purpose test node or special purpose platform that improves the technological field of web page classification and/or web page classification prediction by allowing prediction of a web page class or label via statistical distributions occurring within discriminatory features using information derived from only from anonymized TCP/IP header information, and without the need to examine a packet payload.

Web page classification and/or web page classification prediction is necessarily rooted in computer technology as a hardware computing processor accesses TCP/IP traffic traces associated with downloading content (e.g., packets, traffic) from each of the plurality of web pages, processes the TCP/IP headers from the TCP/IP traffic traces to identify and extract features that discriminate between the labels, training a model trainer to learn a combination of the features that accurately discriminates between the labels, that includes uncorrelated features, and that remains stable across time and/or browser platform, and use the web page classification model to classify unlabeled web pages by applying the web page classification model to TCP/IP traffic traces used to access the unlabeled web pages. Web page classification and/or prediction cannot be performed manually, as TCP/IP traces cannot be manually accessed and/or manipulated.

While the subject matter has been has been described herein in reference to specific aspects, embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Some embodiments of the present subject matter can utilize devices, systems, methods, and/or computer readable media as, such as described in any of the following publications, each publication of which is hereby incorporated by reference as if set forth fully herein:

[1] Hadi Asghari, Michel Van Eeten, Johannes M Bauer, and Milton Mueller. Deep packet inspection: Effects of regulation on its deployment by internet providers. TPRC, 2013.

[2] Eda Baykan, Monika Henzinger, Ludmila Marian, and Ingmar Weber. Purely url-based topic classification. In Proceedings of the 18th international conference on World wide web, pages 1109-1110. ACM, 2009.

[3] Michael Butkiewicz, Harsha V Madhyastha, and Vyas Sekar. Understanding website complexity: measurements, metrics, and implications. In Proceedings of the 2011 ACM SIGCOMM conference on Internet measurement conference, pages 313-328. ACM, 2011.

[4] Flavio Chierichetti, Ravi Kumar, Prabhakar Raghavan, and Tamás Sarlós. Are web users really markovian? In WWW, pages 609-618, 2012.

[5] Junghoo Cho and Hector Garcia-Molina. The evolution of the web and implications for an incremental crawler. 1999.

[6] Fred Douglis, Anja Feldmann, Balachander Krishnamurthy, and Jeffrey C Mogul. Rate of change and other metrics: a live study of the world wide web. In USENIX Symposium on Internet Technologies and Systems, volume 119, 1997.

[7] Jeffrey Erman, Martin Arlitt, and Anirban Mahanti. Traffic classification using clustering algorithms. In Proceedings of the 2006 SIGCOMM workshop on Mining network data, pages 281-286. ACM, 2006.

[8] Jeffrey Erman, Anirban Mahanti, Martin Arlitt, and Carey Williamson. Identifying and discriminating between web and peer-to-peer traffic in the network core. In Proceedings of the 16th international conference on World Wide Web, pages 883-892. ACM, 2007.

[9] Alice Este, Francesco Gringoli, and Luca Salgarelli. On the stability of the information carried by traffic flow features at the packet level. ACM SIGCOMM Computer Communication Review, 39(3):13-18, 2009.

[10] Dennis Fetterly, Mark Manasse, Marc Najork, and Janet Wiener. A large-scale study of the evolution of web pages. In Proceedings of the 12th international conference on World Wide Web, pages 669-678. ACM, 2003.

[11] E Gavaletz, D Hamon, and J Kaur. Comparing in-browser methods of measuring resource load times. In W3C Workshop on Web Performance 8, 2012.

[12] Mark A Hall. Correlation-based feature selection for machine learning. PhD thesis, The University of Waikato, 1999.

[13] Sunghwan Ihm and Vivek S Pai. Towards understanding modern web traffic. In Proceedings of the 2011 ACM SIGCOMM conference on Internet measurement conference, pages 295-312. ACM, 2011.

[14] Gregoire Jacob, Engin Kirda, Christopher Kruegel, and Giovanni *Vigna*. Pubcrawl: Protecting users and businesses from crawlers. In Presented as part of the 21st USENIX Security Symposium, pages 507-522, Berkeley, Calif., 2012. USENIX.

[15] Hyunchul Kim, Kimberly C Claffy, Marina Fomenkov, Dhiman Barman, Michalis Faloutsos, and KiYoung Lee. Internet traffic classification demystified: myths, caveats, and the best practices. In Proceedings of the 2008 ACM CoNEXT conference, page 11. ACM, 2008.

[16] C. Labovitz, S. Iekel-Johnson, D. McPherson, J. Oberheide, and F. Jahanian. Internet inter-domain traffic. In Proc. ACM SIGCOMM, August 2010.

[17] Yeon-sup Lim, Hyun-chul Kim, Jiwoong Jeong, Chong-kwon Kim, Ted Taekyoung Kwon, and Yanghee Choi. Internet traffic classification demystified: on the sources of the discriminative power. In Proceedings of the 6th International Conference, page 9. ACM, 2010.

[18] Gabriel Maciá-Fernández, Yong Wang, Rafael Rodrguez-Gómez, and Aleksandar Kuzmanovic. Isp-enabled behavioral ad targeting without deep packet inspection. In INFOCOM, 2010 Proceedings IEEE, pages 1-9. IEEE, 2010.

[19] B Newton, K Jeffay, and J Aikat. The continued evolution of the web. In Modeling, Analysis and Simulation of Computer Telecommunications Systems, 2013. MASCOTS 2013. 11th IEEE/ACM International Symposium on. IEEE, 2013.

[20] L. Popa, A. Ghodsi, and I. Stoica. Http as the narrow waist of the future Internet. In Proc. 9th ACM Workshop on Hot Topics in Networks (Hotnets-IX), October 2010.

[21] Ashwin Rao, Arnaud Legout, Yeon-sup Lim, Don Towsley, Chadi Barakat, and Walid Dabbous. Network characteristics of video streaming traffic. In Proceedings of the Seventh Conference on emerging Networking Experiments and Technologies, page 25. ACM, 2011.

[22] Sean Sanders and Jasleen Kaur. On the variation in webpage download traffic across different client types. In Proceedings of the Ph.D. Forum, IEEE International Conference on Network Protocols (ICNP'14), 2014.

[23] Dominik Schatzmann, Wolfgang Mühlbauer, Thrasyvoulos Spyropoulos, and Xenofontas Dimitropoulos. Digging into https: flow-based classification of webmail traffic. In Proceedings of the 10th ACM SIGCOMM conference on Internet measurement, pages 322-327. ACM, 2010.

[24] Fabian Schneider, Sachin Agarwal, Tansu Alpcan, and Anja Feldmann. The new web: Characterizing ajax traffic. In Passive and Active Network Measurement, pages 31-40. Springer, 2008.

[25] Muhammad Zubair Shafiq, Lusheng Ji, Alex X Liu, Jeffrey Pang, and Jia Wang. A first look at cellular machine-to-machine traffic: large scale measurement and characterization. In ACM SIGMETRICS Performance Evaluation Review, volume 40, pages 65-76. ACM, 2012.

[26] Qixiang Sun, Daniel R Simon, Yi-Min Wang, Wilf Russell, Venkata N Padmanabhan, and Lili Qiu. Statistical identification of encrypted web browsing traffic. In Security and Privacy, 2002. Proceedings. 2002 IEEE Symposium on, pages 19-30. IEEE, 2002.

[27] Florian Tegeler, Xiaoming Fu, Giovanni Vigna, and Christopher Kruegel. Botfinder: Finding bots in network traffic without deep packet inspection. In Proceedings of the 8th international conference on Emerging networking experiments and technologies, pages 349-360. ACM, 2012.

[28] Gang Wang, Tristan Konolige, Christo Wilson, Xiao Wang, Haitao Zheng, and Ben Y. Zhao. You are how you click: Clickstream analysis for sybil detection. In Presented as part of the 22nd USENIX Security Symposium, pages 241-256, Berkeley, Calif., 2013. USENIX.

[29] Michele C Weigle, Prashanth Adurthi, Felix Hernandez-Campos, Kevin Jeffay, and F Donelson Smith. Tmix: a tool for generating realistic tcp application workloads in ns-2. ACM SIGCOMM Computer Communication Review, 36(3):65-76, 2006.

[30] Andrew M White, Srinivas Krishnan, Michael Bailey, Fabian Monrose, and Phillip Porras. Clear and present data: Opaque traffic and its security implications for the future. NDSS. The Internet Society, pages 24096-1, 2013.

[31] Qiang Xu, Jeffrey Erman, Alexandre Gerber, Zhuoqing Mao, Jeffrey Pang, and Shobha Venkataraman. Identifying diverse usage behaviors of smartphone apps. In Proceedings of the 2011 ACM SIGCOMM conference on Internet measurement conference, pages 329-344. ACM, 2011.

[32] Jun Yan, Ning Liu, Gang Wang, Wen Zhang, Yun Jiang, and Zheng Chen. How much can behavioral targeting help online advertising? In Proceedings of the 18th international conference on World wide web, pages 261-270. ACM, 2009.

[33] Ting-Fang Yen, Xin Huang, Fabian Monrose, and Michael K Reiter. Browser fingerprinting from coarse traffic summaries: Techniques and implications. In Detection of Intrusions and Malware, and Vulnerability Assessment, pages 157-175. Springer, 2009.

[34] Alexa. http://www.alexa.com. Accessed: 2013 Feb. 19.

[35] By 2017, we'll each have 5 internet devices (and more predictions from cisco). http://www.businessinsider.com/cisco-predicts-mobile-2013-5?op=1. Accessed: 2014 May 4.

[36] Global Internet phenomena report. https://www.sandvine.com/downloads/general/global-internet-phenornena/2013/2h-2013-global-internet-phenomena-report-.pdf. Accessed: 2014 Jun. 4.

[37] Half of internet traffic in north America is just to watch netflix and youtube. http://www.thewire.com/technology/2013/05/netflix-youtube-traffic/65210/. Accessed: 2014 May 4.

[38] Interception and disclosure of wire, oral, or electronic communications prohibited. [Online]. Available: http://www.law.cornell.edu/uscode/text/18/2511

[39] Mandatory http 2.0 encryption proposal sparks hot debate. http://www.theregister.co.uk/. Accessed: 2014 May 4.

[40] Mashable. http://mashable.com/2013/08/20/mobile-web-traffic/. Accessed: 2013 Nov. 27.

[41] Netflix performance on verizon and comcast has been dropping for months. http://arstechnica.com/information-technology/2014/02/netflix-performance-on-verizon-and-comcast-has-been-dropping-for-months/. Accessed: 2014 May 4.

[42] Phorm. Available: http://www.phorm.com

[43] Statcounter. http://gs.statcounter.com/. Accessed: 2013 Jun. 30.

[44] Youtube traffic characterization: A view from the edge. http://www.hpl.hp.com/techreports/2007/HPL-2007-119.pdf. Accessed: 2014 Mar. 13.

The disclosures of the foregoing publications (i.e., [1] to [44]) above are hereby incorporated by reference as if set forth fully herein. Various combinations and sub-combinations of the machines, functionality, and/or features described herein are contemplated and will be apparent to a skilled person having knowledge of this disclosure.

Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method of generating and using a web page classification model, the method comprising:
    identifying a plurality of web pages for use in generating the web page classification model;
    assigning a label to each of the plurality of web pages;
    accessing, by a processor, Transmission Control Protocol/Internet Protocol (TCP/IP) traffic traces associated with downloading content from each of the plurality of web pages;
    processing, by the processor, TCP/IP headers from the TCP/IP traffic traces to identify and extract features that discriminate between the labels, that are uncorrelated and whose discriminatory accuracy remains stable across time and/or browser platform;
    generating, by the processor, the web page classification model by training a model trainer to learn a combination of the features that accurately discriminates between the labels, that includes uncorrelated features, and that remains stable across time and/or browser platform; and
    using the web page classification model to classify unlabeled web pages by applying the web page classification model to TCP/IP traffic traces used to access the unlabeled web pages.

2. The method of claim 1, further comprising verifying the accuracy of the web page classification model using observed web page classification data.

3. The method of claim 1, wherein assigning a label to each of the plurality of web pages comprises assigning an Alexa Genre Label (AGL), a Video Streaming Label (VSL), a Targeted Device Label (TDL), or a Web Page Navigation Label (WNL).

4. The method of claim 3, wherein assigning the label includes assigning the AGL and wherein the AGL is a content based label indicative of a content genre class of a web page, the content genre class being selected from generic subjects including computers, shopping, business, or news.

5. The method of claim 3, wherein assigning the label includes assigning the VSL, and wherein the VSL includes at least two classes indicative of the content of a web page, where a first class is video page and a second class is a non-video page.

6. The method of claim 3, wherein assigning the label includes assigning the TDL and wherein the TDL includes at least two classes indicative of a device used to download a web page, where a first class is a traditional web page and a second class is a mobile optimized web page.

7. The method of claim 3, wherein assigning the label includes assigning the WNL and wherein the WNL includes at least three classes indicative of a navigation flow used to download a web page, where a first class is a clickable content page, a second class is a search result page, and/or a third class is a landing page.

8. The method of claim 1, wherein the accessed TCP/IP traces are downloaded using a plurality of different browsers, a plurality of different types of devices, or a plurality of operating systems.

9. The method of claim 1, wherein processing the TCP/IP headers includes processing anonymized TCP/IP headers.

10. The method of claim 1, wherein the features include temporal features, multi-flow features, or statistical derivatives thereof.

11. A system for generating a web page classification model, the system comprising:
    a processor for accessing Transmission Control Protocol/Internet Protocol (TCP/IP) traffic traces associated with downloading content from a plurality of web pages and processing TCP/IP headers from the TCP/IP traffic traces;

a web page classification model generator executed by the processor for generating the web page classification model, wherein the model generator includes:
- a labeler for assigning a label to each of the plurality of web pages;
- a feature extractor for identifying and extracting features from the processed TCP/IP headers that discriminate between the labels, that are uncorrelated and whose discriminatory accuracy remains stable across time and/or browser platform; and
- a model trainer for generating the web page classification model by learning a combination of the features that accurately discriminates between the labels, that includes uncorrelated features, and that remains stable across time and/or browser platform;

wherein the web page classification model is usable to classify unlabeled web pages by applying the web page classification model to TCP/IP traffic traces used to access the unlabeled web pages.

12. The system of claim 11, further comprising a model testing and validation module (MTVM) for verifying the accuracy of the web page classification model using observed web page classification data.

13. The system of claim 11, wherein the label includes at least one of an Alexa Genre Label (AGL), a Video Streaming Label (VSL), a Targeted Device Label (TDL), or a Web Page Navigation Label (WNL).

14. The system of claim 13, wherein the label includes the AGL and the AGL is a content based label indicative of a content genre class of a web page, the content genre class being selected from generic subjects including computers, shopping, business, or news.

15. The system of claim 13, wherein the label includes the VSL and wherein the VSL includes at least two classes indicative of the content of a web page, where a first class is video page and a second class is a non-video page.

16. The system of claim 13, wherein the label includes the TDL and wherein the TDL includes at least two classes indicative of a device used to download a web page, where a first class is a traditional web page and a second class is a mobile optimized web page.

17. The system of claim 13, wherein the label includes the WNL and wherein the WNL includes at least three classes indicative of a navigation flow used to download a web page, where a first class is a clickable content page, a second class is a search result page, and a third class is a landing page.

18. The system of claim 11, wherein the TCP/IP traces are downloaded using a plurality of different browsers, a plurality of different types of devices, or a plurality of operating systems.

19. The system of claim 11, wherein the TCP/IP headers are anonymized.

20. The system of claim 11, wherein the discriminatory features include temporal features, multi-flow features, or statistical derivatives thereof.

21. A non-transitory computer readable medium having stored thereon executable instructions that when executed by a processor of a computer control the computer to perform steps comprising:
- identifying a plurality of web pages for use in generating a web page classification model;
- assigning a label to each of the plurality of web pages;
- accessing Transmission Control Protocol/Internet Protocol (TCP/IP) traffic traces associated with downloading content from each of the plurality of web pages;
- processing TCP/IP headers from the TCP/IP traffic traces to identify and extract features that discriminate between the labels, that are uncorrelated and whose discriminatory accuracy remains stable across time and/or browser platform;
- generating the web page classification model by training a classifier to learn a combination of the features that accurately discriminates between the labels, that includes uncorrelated features, and that remains stable across time and/or browser platform; and
- using the web page classification model to classify unlabeled web pages by applying the web page classification model to TCP/IP traffic traces used to access the unlabeled web pages.

* * * * *